(12) United States Patent  (10) Patent No.: US 8,417,558 B2
Koonce et al.  (45) Date of Patent: *Apr. 9, 2013

(54) SYSTEMS AND METHODS FOR IDENTIFYING OFFERED INCENTIVES THAT WILL ACHIEVE AN OBJECTIVE

(75) Inventors: Ryan Michael Koonce, Austin, TX (US); James Newton Calhoun, Jr., Ross, CA (US); David Allen Bell, Berkeley, CA (US); Sage Bray, San Francisco, CA (US)

(73) Assignee: StrongMail Systems, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/424,302

(22) Filed: Mar. 19, 2012

(65) Prior Publication Data

US 2013/0013393 A1  Jan. 10, 2013

Related U.S. Application Data

(63) Continuation of application No. 11/900,589, filed on Sep. 12, 2007, now Pat. No. 8,140, 376.

(60) Provisional application No. 60/843,789, filed on Sep. 12, 2006, provisional application No. 60/918,088, filed on Mar. 15, 2007.

(51) Int. Cl.
*G06Q 10/00* (2012.01)
(52) U.S. Cl. .................................................. 705/7.29
(58) Field of Classification Search .................. 705/7.29
See application file for complete search history.

(56) References Cited

U.S. PATENT DOCUMENTS

| 7,760,684 | B2 * | 7/2010 | Kadar et al. ................... 370/328 |
| 7,865,394 | B1 * | 1/2011 | Calloway et al. ............ 705/14.4 |
| 2002/0038256 | A1 | 3/2002 | Nguyen |
| 2005/0216338 | A1 * | 9/2005 | Tseng et al. .................... 705/14 |
| 2006/0143081 | A1 | 6/2006 | Argaiz |
| 2007/0157229 | A1 * | 7/2007 | Heathcock ...................... 725/34 |
| 2007/0260523 | A1 | 11/2007 | Schadt et al. |
| 2007/0265915 | A1 * | 11/2007 | Gould et al. .................... 705/14 |
| 2008/0091547 | A1 | 4/2008 | Baker |

(Continued)

OTHER PUBLICATIONS

Pharr, J., "A Research Agenda for Brand-Building on the Internet with Banner Advertising", Services Marketing Quarterly, vol. 26(2) 2004.*

*Primary Examiner* — Mark A Fleischer
(74) *Attorney, Agent, or Firm* — Morgan, Lewis & Bockius LLP

(57) ABSTRACT

A computer implemented method of improving the performance of a viral marketing program comprises exposing, via a computer network, a first offered incentive to a first plurality of users. A first consumer viral marketing action is to be completed to receive the first incentive. First data indicative of the first plurality of users' progress toward achieving the first action is collected thereby providing a likelihood of the first incentive obtaining an objective. A second incentive is exposed to a second plurality of users. A second consumer viral marketing action is to be completed to receive the second incentive. Second data indicative of the second plurality of users' progress toward achieving the second marketing action is collected thereby providing a likelihood of the second incentive obtaining the objective. The first and second data is compared using a metric to identify which incentive is more likely to obtain the objective.

19 Claims, 16 Drawing Sheets

U.S. PATENT DOCUMENTS

| | | |
|---|---|---|
| 2008/0133488 A1 | 6/2008 | Bandaru et al. |
| 2008/0249764 A1 | 10/2008 | Huang et al. |
| 2008/0255933 A1 | 10/2008 | Leventhal et al. |
| 2009/0265245 A1* | 10/2009 | Wright ..................... 705/14.66 |
| 2009/0319372 A1 | 12/2009 | Makeev |
| 2011/0161159 A1 | 6/2011 | Tekiela et al. |

* cited by examiner

224

610 Header Image
"2.4 acres of forest are destroyed every second"
"YOU CAN MAKE A DIFFERENCE"

620 BODY IMAGE
HELP SAVE YOUR PLANET
and get entered into the Eco Adventure
Sweepstakes and win a trip for two to Belize

630 EMAIL BOX AND BUTTON

640 FOOTER INFORMATION

Fig. 6

| 810 | HEADER IMAGE |
|---|---|
| 820 | One of the biggest ways you can help the environment is by encouraging your friends to participate in earthscreen. When you get 5 friends to join you in adopting a rainforest we'll send you a $25 gift card that you can use at Vivavi an earth friendly online store.<br><br>Please select an address book below to select which friends you'd like to get involved in the quest to save some of our most valuable resources. We'll send a personal invitation so you can track which of your friends are interested also adopting your earth. |
| 830 | IMPORTER BUTTONS |
| 840 | IMPORTER COPY BOX (IF SELECTED) |
| 850 | SKIP THIS STEP LINK |

Fig. 8

910 HEADER IMAGE

920 One of the biggest ways you can help the environment is by encouraging your friends to participate in earthscreen. For every friend you get to join earthscreen and adopt a forest, you will get an additional entry into the Eco Adventure Sweepstakes for a trip for two to Belize.

Please select an address book below to select which friends you'd like to get involved in the quest to save some of our most valuable natural resources. We'll send a personal invitation so you can track which of your friends are interested also adopting your earth. The more friends you invite, the more chances you'll have to win!

930 IMPORTER BUTTONS

940 IMPORTER COPY BOX (IF SELECTED)

950 SKIP THIS STEP LINK

Fig. 9

1010
HEADER IMAGE

1020
One of the biggest ways you can help the environment is by encouraging your friends to participate in earthscreen. By joining you get beautiful photographs every day of your adopted forests, all created exclusively for earthscreen by award winning artists.

Every day the images will remind you and your friends of the positive change you are making in the world.

Please select an address book below to select which friends you'd like to get involved in the quest to save some of our most valuable natural resources. We'll send a personal invitation so you can track which of your friends are interested also adopting your earth.

1030
IMPORTER BUTTONS

1040
IMPORTER COPY BOX (IF SELECTED)

1050
SKIP THIS STEP LINK

Fig. 10

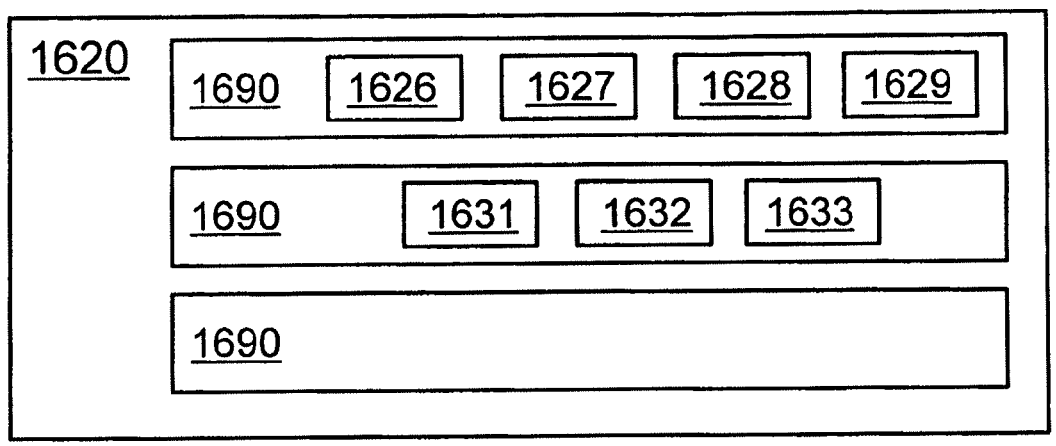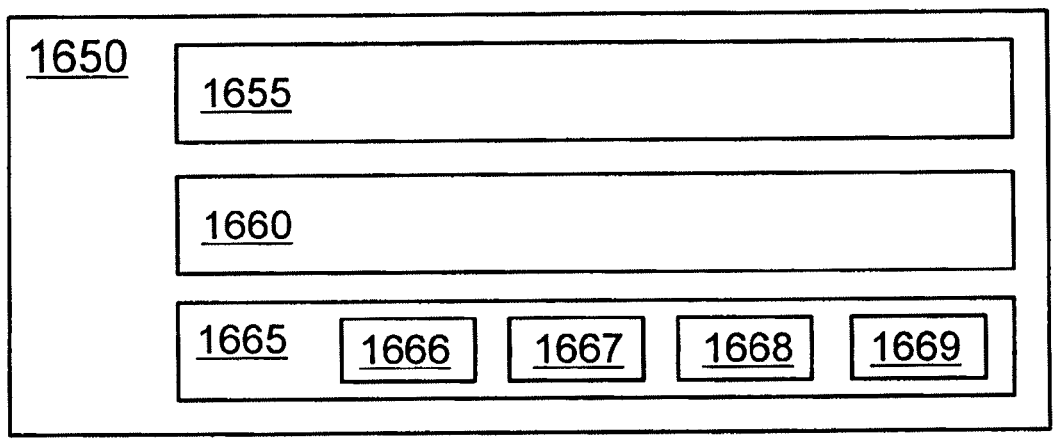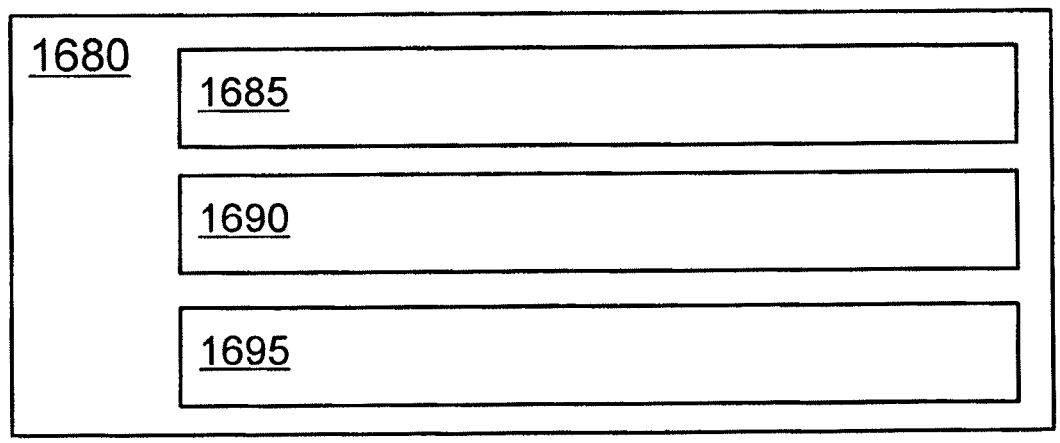
Fig. 16

SYSTEMS AND METHODS FOR IDENTIFYING OFFERED INCENTIVES THAT WILL ACHIEVE AN OBJECTIVE

RELATED APPLICATIONS

This application claims priority to currently pending U.S. Provisional Application No. 60/843,789 filed Sep. 12, 2006 by the inventor's named in this application and U.S. Provisional Application No. 60/918,088 filed Mar. 15, 2007 by the inventors named in this application, the disclosures of both of which are hereby incorporated herein by this reference. This Application also claims priority to, and is a continuation of, U.S. Pat. No. 8,140,376.

BACKGROUND AND SUMMARY

The disclosed system and method relate to marketing systems and more particularly to viral marketing systems and programs.

Many marketing systems are recognized by the marketing and advertising industry for communicating information about a product or service to potential consumers. One form of communication is "word-of-mouth" communication which is generally considered to be the passing of information by verbal means, especially recommendations, but also general information, in an informal, person-to-person manner, rather than by mass media, advertising, organized publication, or traditional marketing. While the term "word-of-mouth communication" implies a spoken form of communication, other forms of passing information between individuals are encompassed within the phrase including written forms of communication. With the advent of computer networks and in particularly the internet, web dialogue, such as blogs, message boards and e-mails are often now included in the definition of word-of-mouth communication.

"Word-of-mouth marketing" or "word-of-mouth promotion" is a term used in the marketing and advertising industry to describe activities that companies undertake to generate personal recommendations as well as referrals for brand names, products and services. Word-of-mouth promotion is highly valued by advertisers. It is believed that this form of communication has valuable source credibility. Research points to individuals being more inclined to believe word-of-mouth promotion than more formal forms of promotion methods because the receiver of word-of-mouth referrals may believe that the communicator is unlikely to have an ulterior motive (i.e.: they are not receiving an incentive for their referrals.) Also, people tend to believe people who they know. In order to promote and manage word-of-mouth communications, marketers use publicity techniques as well as viral marketing methods to achieve desired behavioral response.

"Viral marketing" and "viral advertising" refer to marketing techniques that seek to exploit pre-existing social networks to produce exponential increases in brand awareness, through viral processes similar to the spread of an epidemic. It is word-of-mouth delivered and enhanced online; it harnesses the network effect of the Internet and can be very useful in reaching a large number of people rapidly.

One perceived limitation of word-of-mouth/viral marketing is that while companies have achieved success in generating sustained viral growth for various marketing promotions, it is difficult to predict the success of a viral marketing campaign as success is often a matter of creative chance rather than mathematical or scientific principles. Furthermore, there have been limited successes in generating revenue as the direct result of specific viral marketing campaigns.

The disclosed system and method of marketing facilitates repeatable viral marketing success from a distribution standpoint while allowing the marketer to motivate a desired consumer action not necessarily related to the viral mechanism. The disclosed business process attempts to leverage proprietary word-of-mouth and viral marketing techniques to motivate the maximum number of participants to complete one or more pre-defined consumer action(s) for the minimal cost. In doing so, the business process accounts for and manipulates the inverse correlation between word-of-mouth/viral marketing (generating new participants by exploiting social networks) and the ability to motivate a consumer action (selling a product, etc). The process preferably uses "trials" and "analytics" to achieve these and other business purposes.

The disclosed system and method include a trial process and an analytical suite. The analytical suite takes as inputs the data generated by users interacting with the trial. The outputs of the analytical suite form the basis of a decision making process. The objective of the decision making process is to "optimize" the invitation process to achieve the maximum number of participants, while simultaneously achieving the maximum number of desired consumer actions while minimizing the cost. The challenges presented by the optimization problem are derived from the countervailing nature of these business objectives.

In accordance with one aspect of the disclosure, a method of improving the performance of a viral marketing program comprises developing a plurality of trials of a viral marketing program wherein each of the plurality of trials have a plurality of attributes at least one of which differs from an attribute of the other of the plurality of trials and wherein the viral marketing program has a business objective; exposing a first plurality of users to a first trial of the plurality of trials and a second plurality of users to a second trial of the plurality of trials; collecting first data indicative of the first plurality of users responses to exposure to the first trial which collected first data is reflective of the likelihood of the first trial obtaining the business objective and second data indicative of the second plurality of users responses to exposure to the second trial which collected second data is reflective of the likelihood of the second trial obtaining the business objective; comparing the collected data to identify a trial of the plurality of trials of viral marketing program that is more likely to obtain the business objective than a non-identified trial; and continuing to utilize the identified trial in the viral marketing program while ceasing use of a non-identified trial.

According to another aspect of the disclosure, a computer implemented method of improving the performance of a viral marketing program comprises developing a plurality of trials of a viral marketing program wherein each of the plurality of trials have a plurality of attributes at least one of which differs from an attribute of the other of the plurality of trials and wherein the viral marketing program has a business objective; exposing a first plurality of users to a first trial of the plurality of trials utilizing a first invitation sent over a computer network and a second plurality of users to a second trial of the plurality of trials utilizing a second invitation sent over the computer network; collecting via the computer network first data indicative of the first plurality of users responses to exposure to the first trial which collected first data is reflective of the likelihood of the first trial obtaining the business objective and second data indicative of the second plurality of users responses to exposure to the second trial which collected second data is reflective of the likelihood of the second trial obtaining the business objective; comparing utilizing a processor the collected data to identify a trial of the plurality of trials of the viral marketing program that is more likely to obtain the business objective than a non-identified trial; and continuing to utilize the identified trial in the viral marketing program while ceasing use of a non-identified trial.

According to yet another aspect of the disclosure, a system for improving viral marketing programs comprises a server, a computer network and a plurality of clients. The server is configured to act as a host web-server for communications with web clients and is configured to generate a plurality of web pages. The server includes memory and a processor. The computer network is coupled to the server. The plurality of clients are coupled via the computer network to the server via which a plurality of users may access web pages generated by the server. The clients run a web browser. The processor runs software configured to develop a plurality of trials of a viral marketing program wherein each of the plurality of trials have a plurality of attributes at least one of which differs from an attribute of the other of the plurality of trials and wherein the viral marketing program has a business objective. The server is configured to expose a first plurality of users to a first trial of the plurality of trials utilizing a first invitation sent over a computer network to a client and to expose a second plurality of users to a second trial of the plurality of trials utilizing a second invitation sent over the computer network. The server is configured to collect first data indicative of the first plurality of users responses to exposure to the first trial which collected first data is reflective of the likelihood of the first trial obtaining the business objective. The server is configured to collect second data indicative of the second plurality of users responses to exposure to the second trial which collected second data is reflective of the likelihood of the second trial obtaining the business objective. The server is configured to store the first and second data in memory. The processor is configured to access memory to retrieve the collected first and second data and compare the collected data to identify a trial of the plurality of trials of viral marketing program that is more likely to obtain the business objective than a non-identified trial.

Additional features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The present invention is illustrated by way of example and not limitation in the figures of the accompanying drawings in which like references indicate similar elements and in which:

FIG. 6 is a block diagram of a second landing page utilized with the third and fourth trial of FIG. 2;

FIG. 8 is a block diagram of a first invite page utilized with the first and second trial of FIG. 2;

FIG. 9 is a block diagram of a second invite page utilized with the third and fourth trial of FIG. 2;

FIG. 10 is a block diagram of a third invite page utilized with the fifth and sixth trial of FIG. 2;

FIG. 16 is a block diagram of the micro-site layer, analytics layer and communications layer of one embodiment of a hosted web based technology platform.

DETAILED DESCRIPTION

Figure 1:
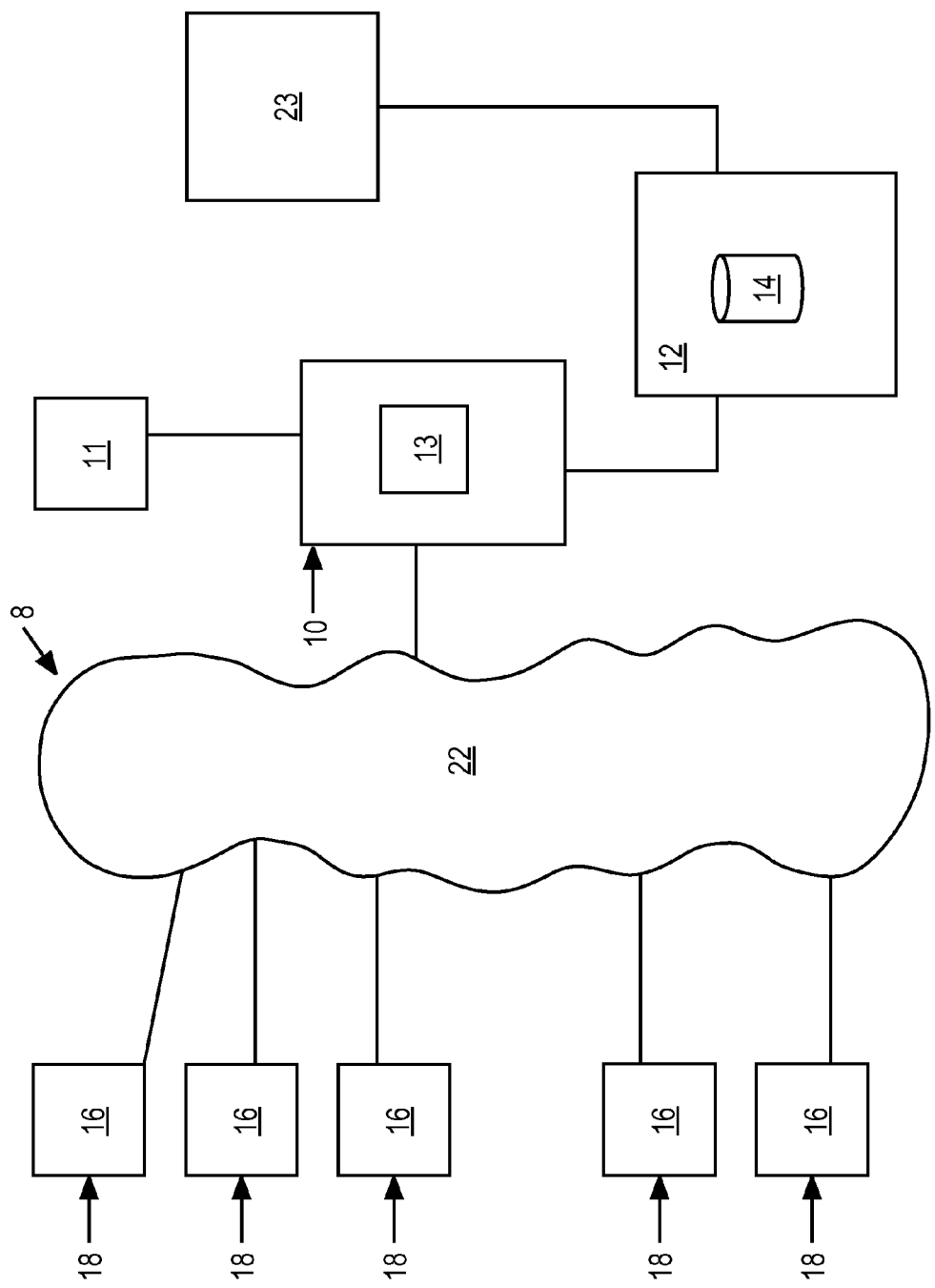
FIG. 1 is a block diagram of a system for implementing the disclosed viral marketing process.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present invention includes any alterations and modifications to the illustrated embodiments and includes further applications of the principles of the disclosure as would normally occur to one skilled in the art to which this invention pertains.

The disclosed system and method preferably seek to achieve one or more of three fundamental business objectives: 1) maximizing the number of participants in a program; 2) maximizing the number and/or amount of desired consumer actions for the program; and 3) minimizing the outlay required for business objectives 1 and/or 2. In order to achieve these business objectives, the disclosed system and method expose users to trials, measure the virality of the trial and the rate of completion for desired consumer actions and, based on measurements and the cost of any motivators or incentives offered to induce actions, expose user groups to updated trials to increase or decrease virality [or increase or decrease the rate of consumers completing the desired actions].

In a preferred embodiment the disclosed viral marketing optimization system 8 and method are implemented in an interne environment. As shown in FIG. 1, the system 8 includes a server 10 communicatively coupled to memory 12 which may include a database 14. In one embodiment, server 10 is configured to act as a host web-server for communications with web clients. Seed users 16 who may have a network connection 18 with the server 10 act to invite other users or invitees 20 to engage in trials of viral marketing processes hosted by the server 10. Data stored in memory 12 and/or database 14 is accessible by an analytical suite 23. An advertiser, who may be the party implementing the server 10 and controlling the viral marketing trials or a third party wishing to gain exposure or increase sales, defines an objective for a viral marketing program. Third party advertisers may pay the party operating the server 10 and implementing the trials for their services.

Although only one server 10 is shown in FIG. 1, it should be understood that viral marketing optimization system 8 can include multiple server computers 10. The server computer 10 can include a personal computer, a computer terminal, a personal digital assistant (PDA) and/or other types of devices generally known to those of ordinary skill in the art.

As illustrated, the viral marketing optimization system 8 includes a processor 13, a clock 11 and memory 12. The viral marketing optimization system 8 can be located on a single server 10 or distributed over several servers. In one embodiment, the viral marketing optimization system 8 is incorporated into one or more web servers. The processor 13 is used to control the operation of the viral marketing optimization system 8. The processor 13 may be comprised of one or more components. For a multi component form of processor 13, one or more components may be located remotely relative to the others, or configured as a single unit. Furthermore, processor 13 can be embodied in a form having more than one processing unit, such as a multi-processor configuration, and should be understood to collectively refer to such configurations as well as a single-processor-based arrangement. One or more components of the processor 13 may be of electronic variety defining digital circuitry, analog circuitry, or both. Processor 13 can be of a programmable variety responsive to software instructions, a hardwired state machine, or a combination of these.

The clock 11 is used to time events in the viral marketing optimization system 8. As should be appreciated, the clock 11 can be incorporated into the processor 13 or can be a stand-alone component. Further, the clock 11 can be hardware and/or software based. Among its many functions, the memory 12 in conjunction with the processor 13 is used to store data regarding the effectiveness of various trials of the viral marketing program. Memory 12 can include one or more types of solid state memory, magnetic memory, or optical memory, just to name a few. By way of nonlimiting example, the memory 12 can include solid state electronic random access memory (RAM), sequential access memory (SAM), such as first-in, first-out (FIFO) variety or last-in, first-out (LIFO) variety, programmable read only memory (PROM), electronically programmable read only memory (EPROM), or electronically erasable programmable read only memory (BEPROM); an optical disc memory (such as a DVD or CD-ROM); a magnetically encoded hard disc, floppy disc, tape, or cartridge media; or a combination of these memory types. In addition, the memory 12 may be volatile, non-volatile, or a hybrid combination of volatile, non-volatile varieties. The memory 12 may further include removable memory which can be in the form of a non-volatile electronic memory unit, optical memory disk (such as a DVD or CD-ROM); a magnetically encoded hard disk, floppy disk, tape, or cartridge media; or a combination of these or other removable memory types.

Network 22 can include the Internet, one or more other wide area networks (WAN), a local area network (LAN), a proprietary network such as provided by America Online, Inc., an institutional network, a cable television network, a public switched telephone network (PSTN), a combination of these, and/or other types of networks generally known to those skilled in the art. In one embodiment of the disclosed system 8, the network 22 includes the Internet.

Seed users 16 and invitees 20, collectively referred to as users, access the viral marketing optimization system 8 through client devices 18. The clients 18 and the server 10 of the viral marketing optimization system 8 communicate with one another by sending signals across the network 22. In one form, these signals can include Simple Mail Transfer Protocol (SMTP), HyperText Mark Up Language (HTML) pages, Extensible Mark Up Language (XML) Page, and other types transmission protocols. For example, the server 10 can send a signal corresponding to an e-mail with an embedded URL and a web page form across the network 22 to the client 18.

The user with client 18 can click on the URL and be presented with the associated webpage which may include a form, fill out the form and send a signal corresponding to the filled-out form across the network 22 to the server 10. By way of non-limiting examples, the clients 18 can include personal computers, both fixed and portable; computer terminals; PDA's; cellular telephones, land line based telephones and the like; television systems, such as televisions, television-based web browsers, digital video recorders, analog video recorders, cable boxes, cable modems, direct broadcast satellite (DBS) boxes, digital versatile disc (DVD) players and video game systems; home entertainment systems, such as stereo equipment, MP3 players, and the like; sound production equipment; video/movie production equipment; or a combination these components, to name a few examples. As shown, the clients 18 are operatively coupled to the server 10 over the network 22. It should be appreciated that the clients 18 can be operatively coupled to the server 10 through hard-wired and/or wireless connections. The clients 18 are hard-wired and/or have software that allows the clients 18 to communicate over the network 22. In one embodiment, the clients 18 are personal computers with software that can include e-mail applications, web browsers, chat programs, and/or proprietary software.

While the system 8 is described as being implemented in a web based environment, it is within the scope of the disclosure for the system 8 and method of optimizing viral marketing to be implemented utilizing other media. For instance, other communication networks and media may be utilized in the trials including a telephone network. In such a system phone banks or automated operators may be utilized to collect the desired information from users and to process the actions and facilitate redemption of the motivators. Such systems may utilize menu driven DTMF recognition systems and voice prompt system to automate the interactions of the users with the system. Further a software program may be utilized to harvest information sent in a variety of manners by a user participating in a trial, for example, sent in a fill-able form, e-mail or similar file.

Figure 2:
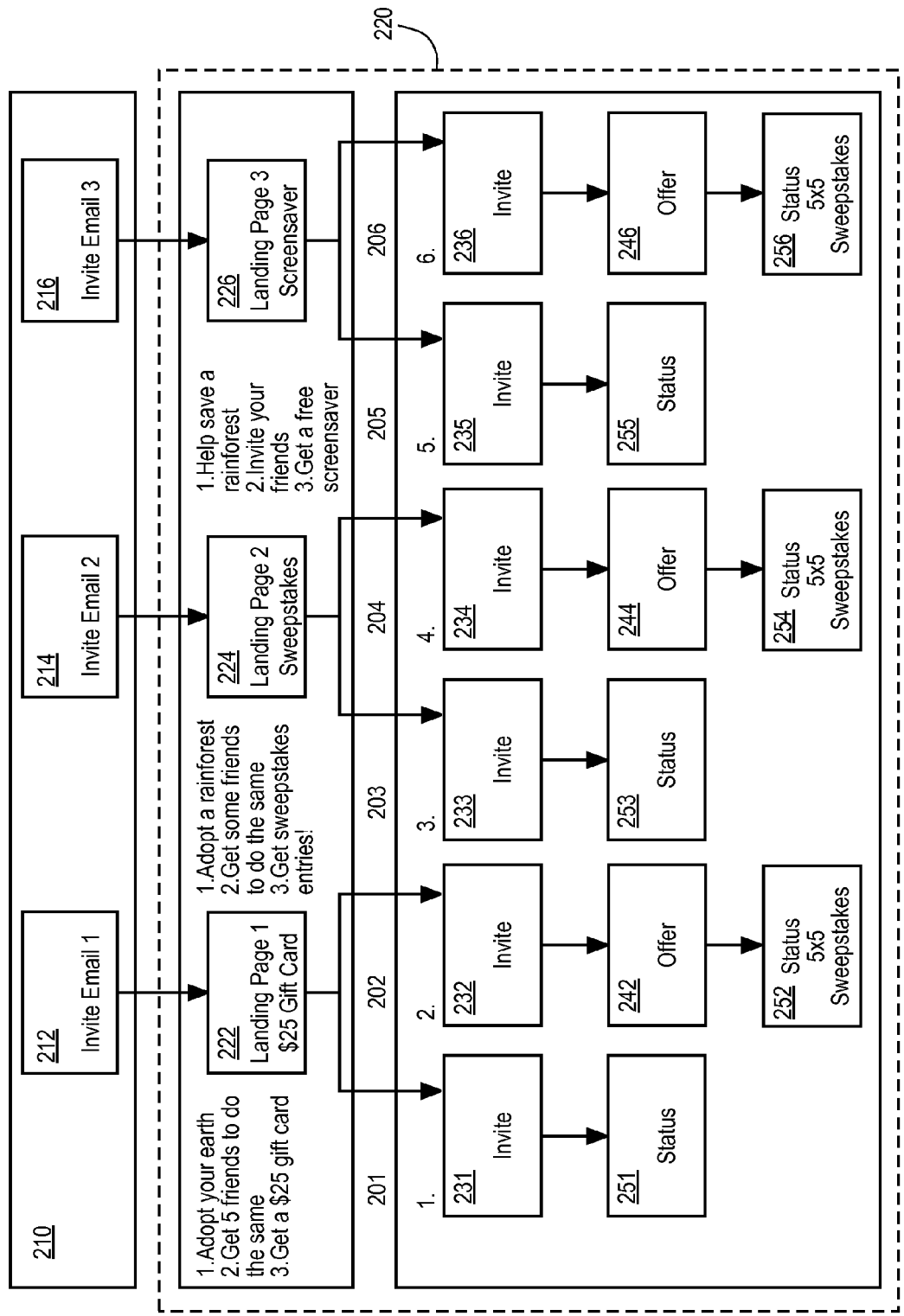
FIG. 2 is a block diagram of six trials of a viral marketing process.

Trials consist of a number of attributes that can be varied and include motivators, actions and an invitation processes, web process, and communication process. FIG. 2 illustrates the relationship of the attributes of six trials 201, 202, 203, 204, 205 and 206. In general, each trial 201-206 is initiated by an invitation process 210 which is the primary business process for exposing users to trials 201-206. Illustratively, the invitation process is initiated by one or more "seed" users. Each user (seed or other) is made an "offer" with the intention of adequately motivating that user to participate in some desired process, such as, for example, a web process or processes.

The invitation process is defined by the trial definition. E-mail is one possible medium used to initiate the invitation process. As, shown, for example in FIG. 2, three invitation e-mails 212, 214 and 216 are utilized to initiate the six trials 201-206. The first invitation e-mail 212 is configured to direct a user to a first landing page 222 which provides a first motivator, illustratively, a twenty five dollar gift card, as an inducement to get the user to perform actions. The second invitation e-mail 214 is configured to direct a user to a second landing page 224 which provides a second motivator, illustratively, sweepstakes entries, as an inducement to get the user to perform actions. The third invitation e-mail 216 is configured to direct a user to a third landing page 226 which provides a third motivator, illustratively, a screen saver, as an inducement to get the user to perform actions. It is within the scope of the disclosure for more or less than six trials to be conducted and for more or less than three invitation e-mails and landing pages to be utilized in the invitation process 210.

While the description below focuses generally on the cost of the motivators and the actions requested during the trial as the attributes which may change between various trials, there are many other attributes that may be modified. For example, the invitation e-mail will have a subject line as one attribute, a text that identifies the desired action and motivator as well as possibly some inspirational language, a mechanism for accessing the trials (e.g. a hyper-text link to a landing page) and possibly even graphics. Data may be collected to establish the effectiveness of each of these attributes in generating the desired user interactions and based on this data, any one or more of these attributes may be modified in the trials to improve the viral marketing program, including placement, emphasis and other aspects of these attributes.

FIG. 2 depicts e-mail as the media for initiating the invitation process 210, however, it is within the scope of the disclosure for other media to be used to initiate the invitation process 210. Examples of other media which may be utilized to initiate the invitation process 210 are websites, mobile technologies (cellular, Blackberry, etc.), internet phone (Skype), social networking sites (Myspace), instant messaging (Yahoo!IM, AIM, etc.), etc. Each of these media and other non-disclosed media may serve as a communication utility by which acquaintances can be sent generic messages. Additionally, as mentioned above, other media may be utilized to implement the trial.

Figure 3:
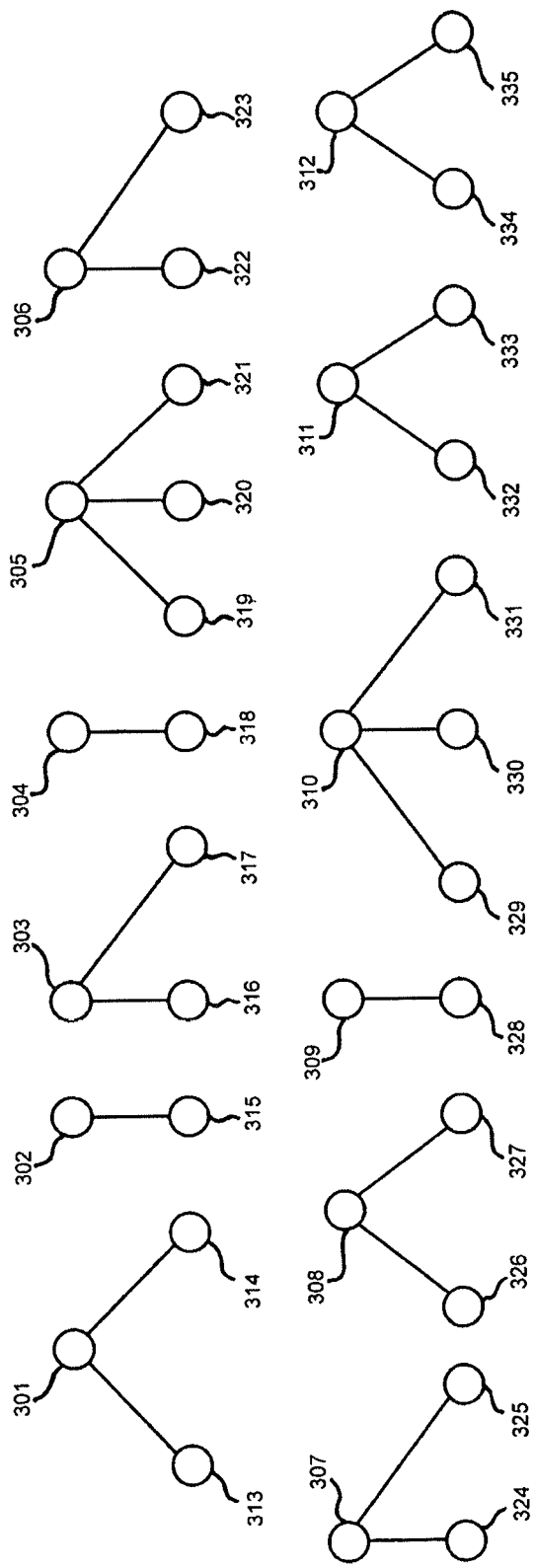
FIG. 3 is a relational diagram of twelve seed users each inviting one to three invitees into a viral marketing system.
Figure 4:
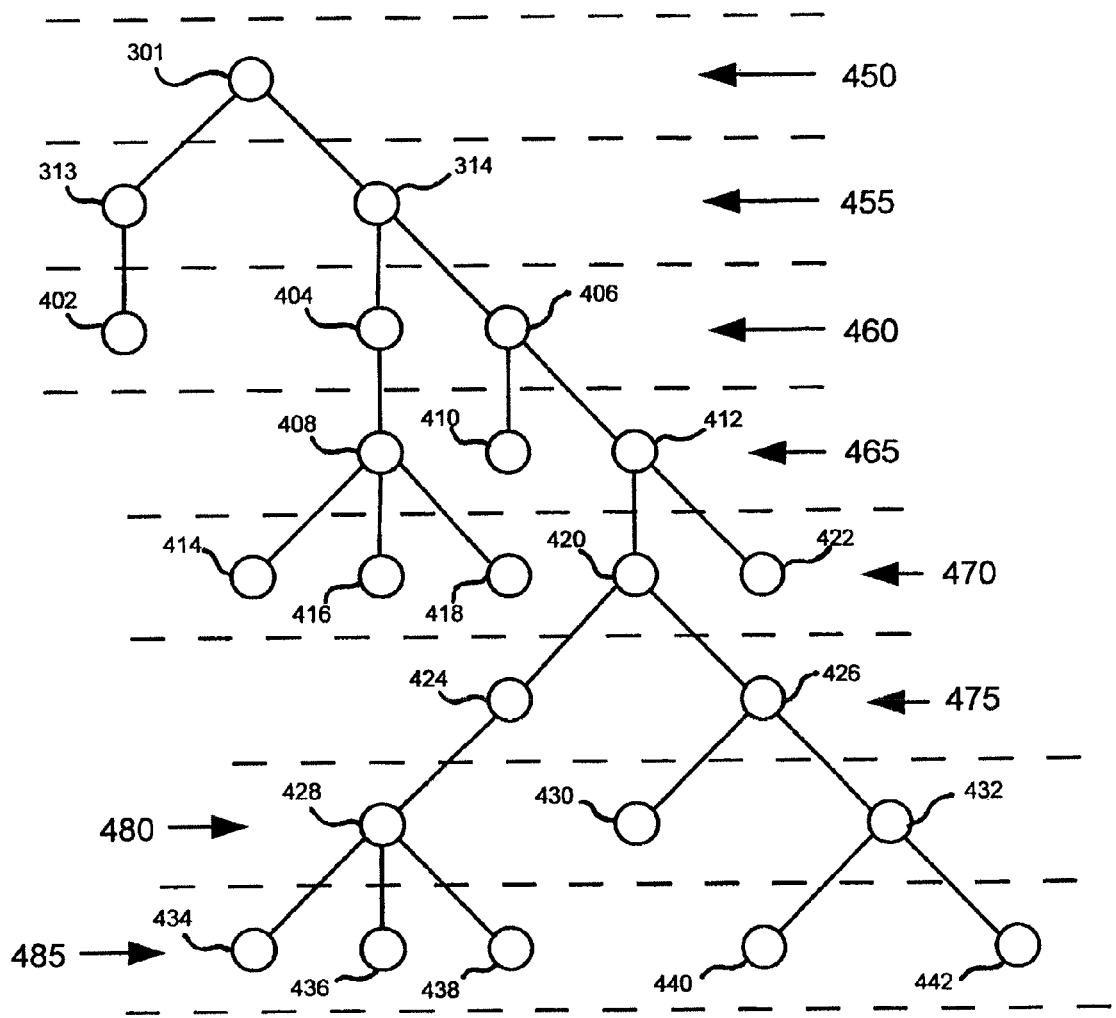
FIG. 4 is a relational diagram of the parent child relationship between a single seed user, the seed user's invitees and invitees invited by other invitees of a viral marketing system.

As shown for example in FIGS. 3 and 4, the invitation process can result in multiple users being invited to participate in trials of the viral marketing system. FIG. 3 illustrates a hypothetical invitation process in which each of twelve seed users 301-312 is shown inviting between one to three people or invitees 313-335. Illustratively, seed user 301 invites invitees 313 and 314, seed user 302 invites invitee 315, seed user 303 invites invitees 316 and 317, seed user 304 invites invitee 318, seed user 305 invites invitees 319-321, seed user 306 invites invitees 322 and 323, seed user 307 invites invitees 324 and 325, seed user 308 invites invitees 326 and 327, seed user 309 invites invitees 328 seed user 310 invites invitees 329-331, seed user 311 invites invitees 332 and 333 and seed user 312 invites invitees 334 and 335. However, as shown, for example, in FIG. 4, each invitee may act as a seed user by inviting additional invitees.

Following the above example, FIG. 4, illustrates that the invitees 313 and 314 of seed user 301 may act as seed users to invite people they know, who may, in turn, invite the people they know, the invitation process may be represented as parent-child relationships that span many generations. The process begins with a first generation 450 seed user 301 (top node) who, as explained above, invites two second generation 455 invitees 313 and 314 to participate in the trial. Invitee 313 may then act as a seed user and invite another invitee 402 to participate in the trial. Additionally, invitee 314 may act as a seed user and invite invitees 404 and 406 to participate in the trial. Thus, invitees 402, 404 and 406 form a third generation 460. Illustratively, invitee 404 acts as a seed user to invite invitee 408 to participate in the trial. Additionally invitee 406 acts as a seed user to invite invitees 410 and 412 to participate in the trial. Invitees 408, 410 and 412 form a fourth generation 465. Invitee 408 illustratively acted as a seed user to invite invitees 414, 416 and 418 to participate in the trial. Additionally invitee 412 acted as a seed user to invite invitees 420 and 422 to participate in the trial. Invitees 414, 416, 418, 420 and 422 form a fifth generation 470. Illustratively, invitee 420 was the only fifth generation user to act as a seed user and invite invitees 424 and 426 to participate in the trial. Invitees 424 and 426 form a sixth generation 475. Invitee 424 acted as a seed user to invite invitee 428 to participate in the trial. Illustratively invitee 426 acted as a seed user to invite invitees 430 and 432 to participate in the trial. Invitees 428, 430 and 432 form a seventh generation 480. Invitee 428 acted as a seed user to invite invitees 434, 436 and 438 to participate in the trial. Additionally invitee 432 acted as a seed user to invite invitees 440 and 442 to participate in the trial. Invitees 434, 436, 438, 440 and 442 form an eighth generation 485.

Returning to FIG. 2, the motivator in one embodiment is a reward provided to the user for fulfilling the action. Motivators usually consist of a prize, such as a gift card, cash, product, or sweepstakes, but can also include non-tangible items such as the desire to feel important. Tangible motivators typically have a cost associated therewith. As mentioned previously, the motivators in the illustrated example are a gift card, sweepstakes entries to win a prize and a free screen saver. One purpose of the trials 201-212 is to help determine which motivators are most effective in inducing users to complete the desired actions. Some motivators may be highly effective in inducing users to perform a first action but totally ineffective in inducing a second action, while a second motivator may be highly effective in inducing users to perform the second action but less effective in inducing users to perform the first action. Thus, for each motivator, separate trials may be conducted to determine the effectiveness of the motivator to induce users to perform different actions. Additionally, some motivators may be highly effective in inducing almost any action but be so costly that it is not desirable to offer these motivators in particular trials.

One or more pre-defined consumer actions may be required to be accomplished by an invitee user in order for the invitee user to receive the motivator. Required actions could include registering at a site, clicking a link in an e-mail, sending a certain number of e-mails to friends, or getting a certain number of friends to register with the viral marketing system. As used herein "friend" should be interpreted broadly. Friend may include anyone with whom a user is familiar or knows how to contact.

The web process 220 utilized in one embodiment of the trials includes a sequenced selection of web pages. The web process 220 includes a number of web pages with varying elements, as well a desired order of the web pages. There can be any number of web pages (defined by the attributes of the page). Users most often reach the web process 220 through an invitation e-mail, such as invitation e-mails 212, 214 and 216 sent in the invitation process 210. In one embodiment, the pages most used in the web process 220 include one or more landing pages 222, 224 and 226, one or more invite pages 231, 232, 233, 234, 235 and 236, one or more offer pages 242, 244 and 246 and one or more status pages 251-256. As shown, for example, in FIG. 2, an invitation e-mail 212, 214 or 216 is sent by a seed user to an invitee to notify the invitee about an offer that is available to the invitee. For non-seed users this invitation e-mail 212, 214 or 216 is sent from another user for whom the recipient is an acquaintance. Illustratively, the invitation e-mail 212, 214 or 216 includes a hyperlink that points to a landing page 222, 224 or 226. In alternative embodiments, the hyperlink may be included, for example, on a seed users page on social networking site or may be sent in an instant message to an invitee.

When an alternative media is utilized in the invitation process 210, a hyperlink or other means of directing an invitee to a landing page may be presented by the alternative media. Alternatively, some non-web base media may be utilized to implement the either or both of the invitation process and the processes of the trials. For example an invited user may be requested to send a post card including information or call a specific telephone number to register for the trials of the viral marketing program. The trials may be carried out using such media. When an oral communication media, such as a telephone or radio advertisement, or visual communication media, such as television advertisement, a letter, postcard or note, is utilized in the invitation process 210 the URL may be provided to the invitee to instruct the user to direct their web browsing software to the landing page.

Figure 5:
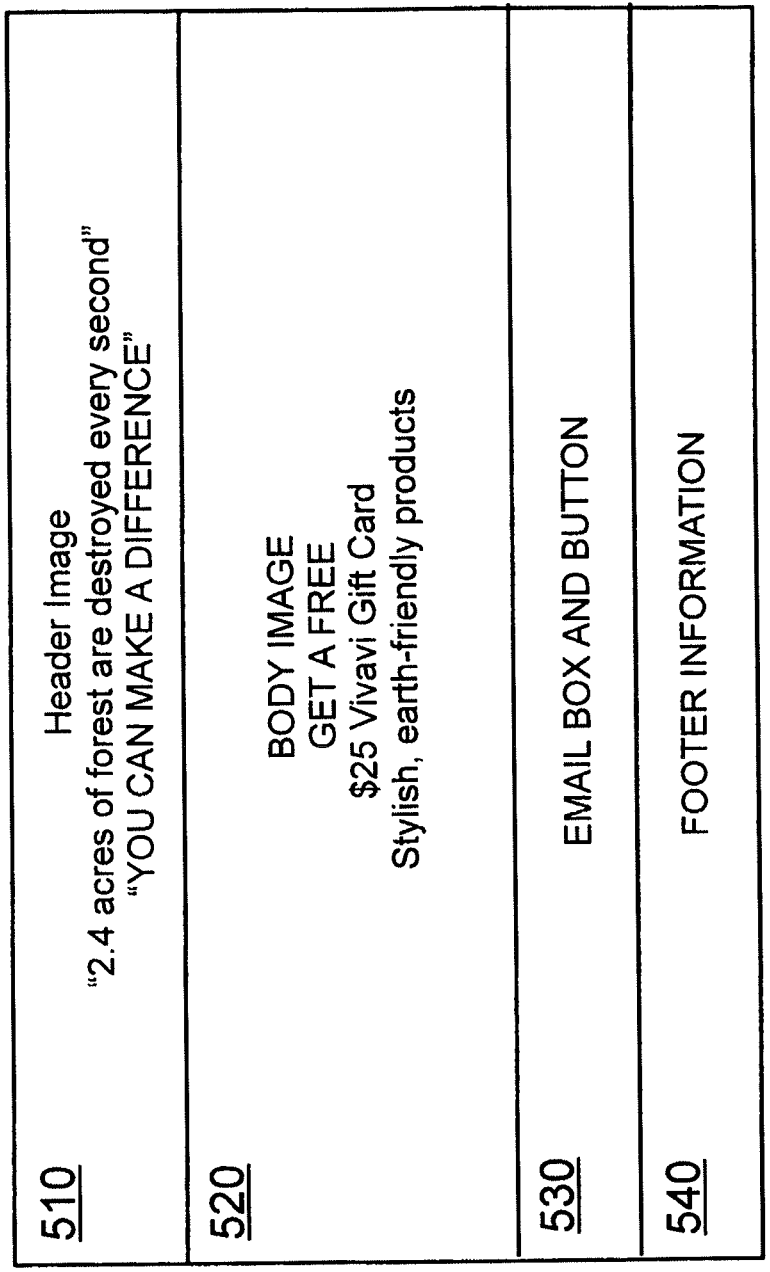
FIG. 5 is a block diagram of a first landing page utilized with the first and second trial of FIG. 2.
Figure 7:
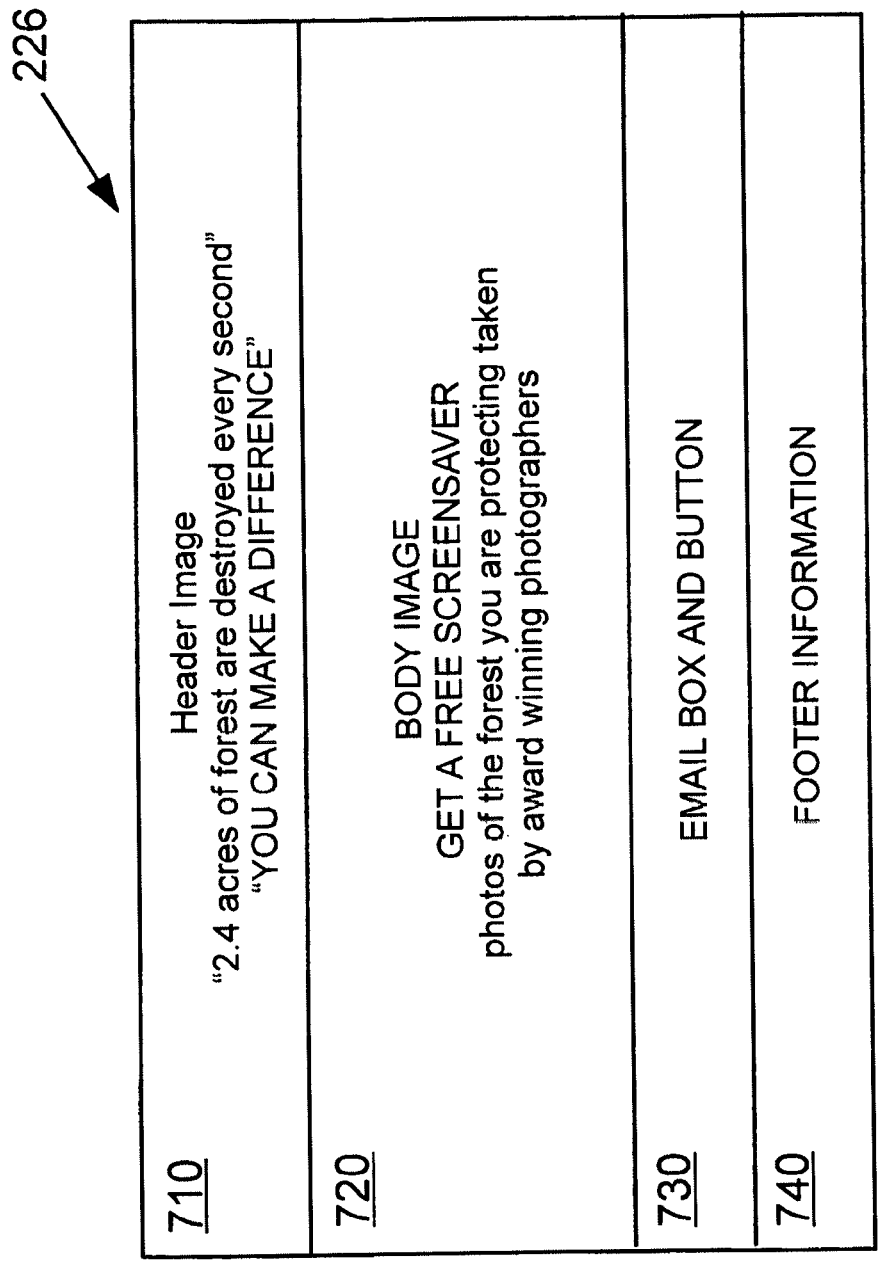
FIG. 7 is a block diagram of a third landing page utilized with the fifth and sixth trial of FIG. 2.

The landing page 222, 224, 226 is used to present the invited user with an "offer," i.e. the motivator, and explain the action that must be completed to receive the offer. The landing page may also be utilized for other purposes within the scope of the disclosure, including, but not limited to, collecting personal information, e.g. the e-mail address of the user. As, shown, for example, in FIGS. 5-7, each landing page may include a header image frame 510, 610, 710, a body image frame 520, 620, 720, e-mail box and button frame 530, 630, 730 and footer information frame 540, 640, 740. Since each of the illustrated landing pages 222, 224, 226 is to be used in trials to determine the effectiveness of a motivator to induce an invitee to perform an action or actions to benefit a specific target beneficiary, each header image frame 510, 610 and 710 contains the same image and information. In the disclosed example, the target beneficiary of the viral marketing is an environmentalism entity and thus the header image frame 510, 610, 710 may include an environmental message, e.g. "2.4 acres of forest are destroyed every second. You can make a difference." The presentation contained in the header image frame 510, 610, 710 is another of the attributes of the trials that may be changed or presented differently in the various trials so that efforts can be made to optimize the content of the header image frame 510, 610, 710.

Each landing page 222, 224 and 226 also contains identical e-mail box and button frame 530, 630, 730 to facilitate collection of personal information such as the e-mail address of the invitee. It is within the scope of the disclosure for landing pages 222, 224, 226 to include other non-illustrated information acquisition frames in addition to or instead of e-mail box and button frame 530, 630, 730, such as frames that facilitate the collection of personal information such as household income, sex, race, age or other demographic information or telephone numbers, home address, e-mail, work address, work telephone number or other contact information from the invitee.

Each landing page 222, 224, 226 may also include footer information 540, 640, 740. Footer information may include text or graphics that can be varied between trials in an effort to optimize the viral marketing program. Alternatively, footer information may contain advertising which may be utilized as one income generation method for the party operating the server and or implementing and controlling the attributes of the various trials.

The landing pages 222, 224 and 226 are differentiated by the contents of the body image 520, 620, 720. As shown, for example, in FIG. 5, the landing page 222 accessed by users invited by first invitation e-mail 212 to participate in either the first trial 201 or second trial 202 contains a body image frame 520 that states "GET A FREE $25 Vivavi Gift Card. Stylish, earth-friendly, products." As shown, for example, in FIG. 6, the landing page 224 accessed by users invited by second invitation e-mail 214 to participate in either the third trial 203 or fourth trial 204 contains a body image frame 620 that states "HELP SAVE YOUR PLANET and get entered into the Eco Adventure Sweepstakes and win a trip for two to Belize." As shown, for example, in FIG. 7, the landing page 226 accessed by users invited by third invitation e-mail 216 to participate in either the fifth trial 205 or sixth trial 206 contains a body image frame 720 that states "GET A FREE SCREENSAVER Photos of the forest you are protecting taken by award winning photographers." Thus, body image frames 520, 620, 720 serve to identify the motivator that is to be tested during the trials 201-206.

Body image frame 520, 620, 720 is also preferably a clickable frame that will direct the user's web browser to the appropriate invite page for the trial in which they are participating. Thus, clicking on the body image frame 520 would direct an invitee who accessed landing page 222 via invitation e-mail 212 to either invite page 231 for the first trial or invite page 232 for the second trial.

The invite page 231-236 is used to present the invited user with invitation process facilitation tools. For the illustrated example, wherein e-mail is the media utilized during the invitation process 210, invite pages 231-236 provide the tools necessary for invitees to send acquaintances Invitation E-mails. As shown, for example, in FIGS. 8-9, invite pages 231-236 may be similar to invite pages 800, 900, 1000 and thus include header image frames 810, 910, 1010, information frames 820, 920, 1020, importer button frames 830, 930, 1030, importer copy box frames 840, 940, 1040 and skip this step link frames 850, 950, 1050. The importer button frames 830, 930, 1030, importer copy box frames 840, 940, 1040 and skip this step link frames 850, 950, 1050 may be identical in each of the illustrated invite pages 800, 900, 1000. The importer button frames 830, 930, 1030 typically contain well known tools, or links to such tools, for importing an address book from another application while the importer copy box frames 840, 940, 1040 typically are configured to display the imported address book. The header image frames 810, 910, 1010 may be the same in each of the invite pages 800, 900, 1000 or may be an attribute that can be modified to optimize the viral marketing program and thus be different between at least two trials.

The information frames 820, 920, 1020 act to differentiate the invite pages 800, 900 and 1000 from one another, and thus, in the illustrated example, are attributes which may be tested. In one embodiment, invite page 800 may serve as the invite page 231, 232 accessed via landing page 222 by invitees who received invitation e-mail 212 who elect to participate in the first trial 201 or the second trial 202. Thus, information frame 820 may contain a message like One of the biggest ways you can help the environment is by encouraging your friends to participate in earthscreen. When you get 5 friends to join you in adopting a rainforest, we'll send you a $25 gift card that you can use at Vivavi, an earth friendly online store.

Please select an address book below to select which friends you'd like to get involved in the quest to save some of our most valuable natural resources. We'll send a personal invitation so you can track which of your friends are interested in also adopting your earth.

Thus, invite page 800 identifies both the motivator, i.e. a twenty-five dollar gift card from an environmentally friendly store, and the action, i.e. adopting the rainforest and getting five friends to adopt the rainforest, that is required to receive the motivator in the first and second trials 201, 202.

In one embodiment, invite page 900 may serve as the invite page 233, 234 accessed via landing page 224 by invitees who received invitation e-mail 214 who elect to participate in the third trial 203 or the fourth trial 204. Thus, information frame 920 may contain a message like:

One of the biggest ways you can help the environment is by encouraging your friends to participate in earthscreen. For every friend you get to join earthscreen and adopt a forest, you will get an additional entry into the Eco Adventure Sweepstakes for a trip for two to Belize.

Please select an address book below to select which friends you'd like to get involved in the quest to save some of our most valuable natural resources. We'll send a personal invitation so you can track which of your friends are interested in also adopting your earth.

Thus, information frame 920 of invite page 900 identifies both the motivator, i.e. an entry into a sweepstakes for a trip to a country with a rainforest, and the action, i.e. adopting the rainforest and getting a friend to adopt the rainforest, that is required to receive the motivator in the third and fourth trials 203, 204.

In one embodiment, invite page 1000 may serve as the invite page 235, 236 accessed via landing page 226 by invitees who received invitation e-mail 216 who elect to participate in the fifth trial 205 or the sixth trial 206. Thus, information frame 1020 may contain a message like:

One of the biggest ways you can help the environment is by encouraging your friends to participate in earthscreen. By joining you get beautiful photographs every day of your adopted forests all created exclusively for earthscreen by award winning artists.

Every day the images will remind you and your friends of the positive change you are making in the world.

Please select an address book below to select which friends you'd like to get involved in the quest to save some of our most valuable natural resources. We'll send a personal invitation so you can track which of your friends are interested in also adopting your earth.

Thus, information frame 1020 in invite page 1000 identifies both the motivator, i.e. beautiful photographs via a screen saver, and the action, i.e. joining earthscreen, that is required to receive the motivator in the fifth and sixth trials 205, 206. It should be noted that the motivator and the action differ between the various invite pages 810, 910, 1010, allowing the motivator and actions to be attributes that may be tested, in the illustrated embodiment, to optimize the viral marketing campaign.

As shown, for example in FIG. 2, the web process 220 in some trials, illustratively the second trial 202, the fourth trial 204 and the sixth trial 206, includes presenting an offer page 242, 244, 246 to the invitee. Via this offer page, the user is offered a product or service, usually for a fee. The web process 220 in some trials, such as, for example, the first trial 201, the third trial 203 and the fifth trial 205, will not include such an offer page. The presentation or lack of presentation of an offer page during a trial may have a beneficial impact on the success of the trial and may thus is an attribute, in the illustrated embodiment, that be measured to help determine the optimal viral marketing scheme for a specific product or service.

Figure 11:
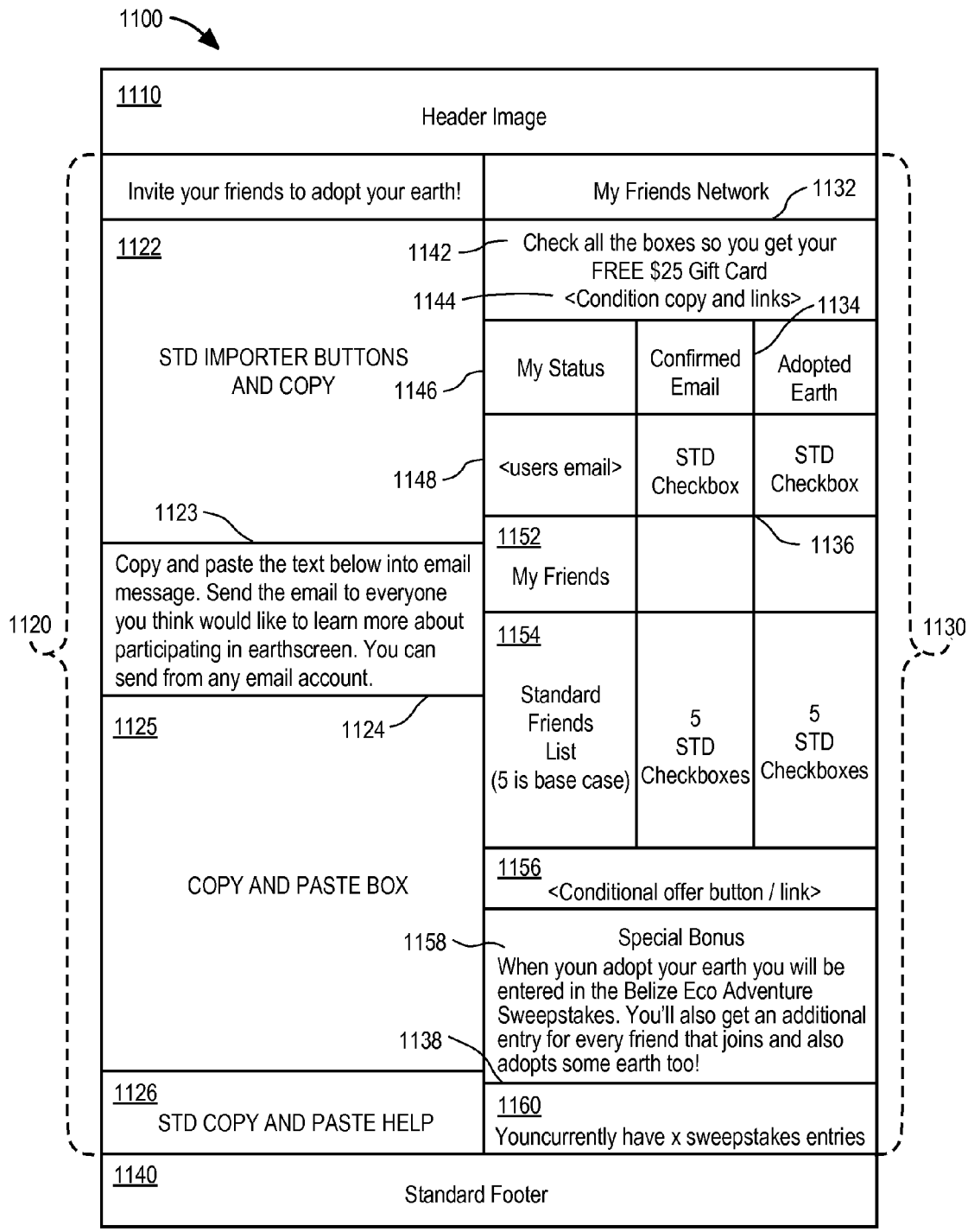
FIG. 11 is a block trial of a status page utilized with the first and second trial of FIG. 2.

The web process 220 may include presenting a user with a status page 251-256 that may be used to view whether the user's invitees took requisite actions. FIG. 11 illustrates an exemplary status page 1100 configured for presentation as the status page 251 in the first trial 201 or status page 252 in the second trial 202. After reading the foregoing, it will be apparent that status pages 252-256 will be similar to, but differ in some details related to the motivator and the action, to status page 1100. Status page 1100 includes a header image frame 1110, an invitation tools window 1120, an actions status window 1130 and a standard footer frame 1140.

The header image frame 1110 and the standard footer frame 1040 may be the same in various embodiments of the status page and contain information and graphics reflective of the purpose of the trial, the entity benefiting from the trial or other information. It is within the scope of the disclosure for the header image frame and the standard footer frame 1040 to differ between various trials and for data to be collected providing some indication of the effectiveness of each variation.

The invitation tools window 1120 includes tools to facilitate sending invitations to friends or persons in a user's network of contacts. In an embodiment of the disclosed system and method wherein the invitation process utilizes invitation e-mails as the invitation medium, such as that illustrated in FIG. 2, the invitation tools window 1120 is an e-mails tool window that provides tools that facilitate sending invitation e-mails. Thus, as shown, for example, in FIG. 11, invitation tools window 1120 may include a standard importer buttons and copy frame 1122, a copy and paste frame 1124 and a standard copy and paste help frame 1126. Standard importer buttons and copy frame 1122 contains standard tools to facilitate importing an address book or individual e-mail addresses from another application. Copy and paste box frame 1124 illustratively includes an instruction box 1123 that includes instructions advising the user that other e-mail accounts may be utilized to send invitation e-mails to invitees and a text box 1125 which may contain text of an appropriate invitation e-mail. Standard copy and paste help frame 1126 includes standard help tools to facilitate generation of invitation e-mails.

It is within the scope of the disclosure for the status page 1100 to include other invitation tool windows that contain tools that will facilitate carrying out the invitation process utilizing media other than e-mails. For example, tools may be provided for providing links and approved invitation text and graphics on a user's blog page or within a user's instant message program.

Actions status window 1130 includes various frames configured to provide the user with information regarding the status of user and the user's progress toward completing the action or actions required to receive the motivator. As shown, for example, in FIG. 11, actions status window 1130 includes an informational frame 1132, a user completed action frame 1134 and an invitee completed action frame 1136. Additionally, informational frame 1132 may include a special bonus frame 1138.

The illustrated informational frame 1132 includes a motivator identification text 1142 and a link 1144 to a conditional copy and links. In the illustrated example, the motivator identifications text 1142 states "Check all boxes to get your Free $25 Gift Card" since the illustrated status page is an example of a status page to be used with the first trial 201 or second trial 202 both of which offer a twenty-five dollar gift card as the motivator. The link displays the appropriate text depending upon whether certain conditions are satisfied. For example, if all conditions for redemption of the motivator have not been satisfied, the link causes text to be displayed that contains an imbedded hypertext link to the offer. In the illustrated embodiment, if the redemption conditions have not been met the link 1144 generates the text and hypertext link "You need just x more friends to join and Adopt the Earth," where x is the number still required and Adopt the Earth is a clickable hypertext link that will direct the user's browser to the offer page. If all of the conditions for redemption of the motivator have been met, the link 1144 will cause text and a hypertext link to be present to facilitate redemption of the motivator by the user. In the illustrated example, the text and hypertext link are "Congratulations! Click here to get your gift card," where Click here is a clickable hypertext link that will direct the user's web browser to a Redemption page for the gift card.

User completed action frame 1134 is divided into columns and rows with the first row being a title bar 1146 identifying the information displayed therebelow and the second row being an information display frame 1148. In the illustrated embodiment, the title bar 1146 includes the text "My Status" in a first column, "Confirmed e-mail" in a second column and "Adopted Earth" in a third column. The first column of the information display frame 1148 includes the e-mail address provided by the user at the time of acceptance of the invitation. The second column of the information display frame 1148 includes a standard conditional check box. If the user has not confirmed their e-mail address, a clickable blinking unchecked checkbox is displayed in the second column of the information display frame 1148 which when clicked directs the user's browser to a page, frame, drop down box, pop-up box, etc. wherein the user can enter the information required to confirm the e-mail address. If the user has confirmed the e-mail, the second column of the information display frame 1148 displays a standard checked check box. In the adopt earth column of the second row of the information display frame 148, a standard check box appears that is checked if the user has completed the standard offer and is a flashing and unchecked if The invitee completed action frame 1136 includes a title bar 1152 in a first row, an information display frame 1154 in a second row and a conditional offer button/link 1156 in the third row. Since in the illustrated embodiment, the user's invitees must also confirm their e-mail and adopt the earth, the first and second rows are divided into as many columns as the user completed action frame 1134. The title bar includes text stating "My Friends" in the first column and nothing in the second and third columns since the text in the second and third columns of the title bar 1146 of the user completed action frame 1134 can act to identify the information displayed in the second and third columns of the information display frame 1148. The first column of the information display frame 1154 in the illustrated embodiment includes a standard friends list identifying the invitees of the user. The user's invitees may be identified by their e-mail addresses or by some other identifier information such as nicknames associated with the invitee in an e-mail address book imported from another application by the user at the time of acceptance of the invitation. The second column of the information display frame 1154 includes a standard check box for each of the friends in the list of friends in the first column. For each listed friend, the standard checkbox is unchecked if the friend has not confirmed the friend's e-mail address and checked if the friend has confirmed the friend's e-mail. The third column of the information display frame 1154 includes a standard check box for each of the friends in the list of friends in the first column. For each listed friend, the standard checkbox is unchecked if the friend has not adopted the earth and checked if the friend has adopted the earth. It is within the scope of the disclosure for other presentations to be utilized to keep the user informed of their status toward completing all of the actions required to receive the motivator, such as, for example, sending the user an e-mail each time an action is completed which e-mail may also indicate the actions remaining to be completed before the user is entitled to receive the motivator.

As shown, for example, in FIG. 11, special additional incentives may be offered to an invitee to induce further efforts by the invitee above the minimum effort required to receive the basic motivator. For example, in the disclosed embodiment, in the second trial 202 in addition to awarding the user a gift card after five invitees have been sent invitations and adopted the earth, the user may be provided with a sweepstakes entry for each invitee who adopts the earth. Therefore, as shown, for example, in FIG. 11, the informational frame 1132 may include a special bonus frame 1138 providing information about this special offer. The special bonus frame 1138 may include a first box 1158 informing the user of the conditions of the special bonus offer and an update box 1160 that updates the user on their progress with regard to the special bonus. In the illustrated embodiment, the update box 1160 contains text stating "You currently have x sweepstakes entries" where x is the number of entries and the user gets one entry for every friend that completes the offer.

As shown, for example, in FIG. 2, the special bonus is not offered in the first, third and fifth trials 201, 203 and 205, but is offered in the second, fourth and sixth trials 202, 204 and 206. Thus, Status page 1100 is an exemplary status page 252 for the second trial 202. In one example, the status page for the first trial 201 will be nearly identical to status page 1100 but will not include the special bonus frame 1138. The status pages 253, 254, 255, 256 for the third, fourth, fifth and sixth trials, 203, 204, 205 and 206, respectively, may be similar to status page 1100 but include information in the actions status window 1130 to accurately communicate the user's progress toward completion of the required actions to receive the motivator and any special bonus for those trials.

The status page is only one form of a communication sub-process of the disclosed web process 220. The communication sub-process is used to supplement the invitation process 210 and the web process 220 and remind users of their status, such as whether the user's invitees have completed the requisite actions, or whether the user has completed the required actions to receive a motivator. As mentioned above, this communication sub-process may be carried out using other methods and devices such as by sending the user update e-mails.

Figure 12:
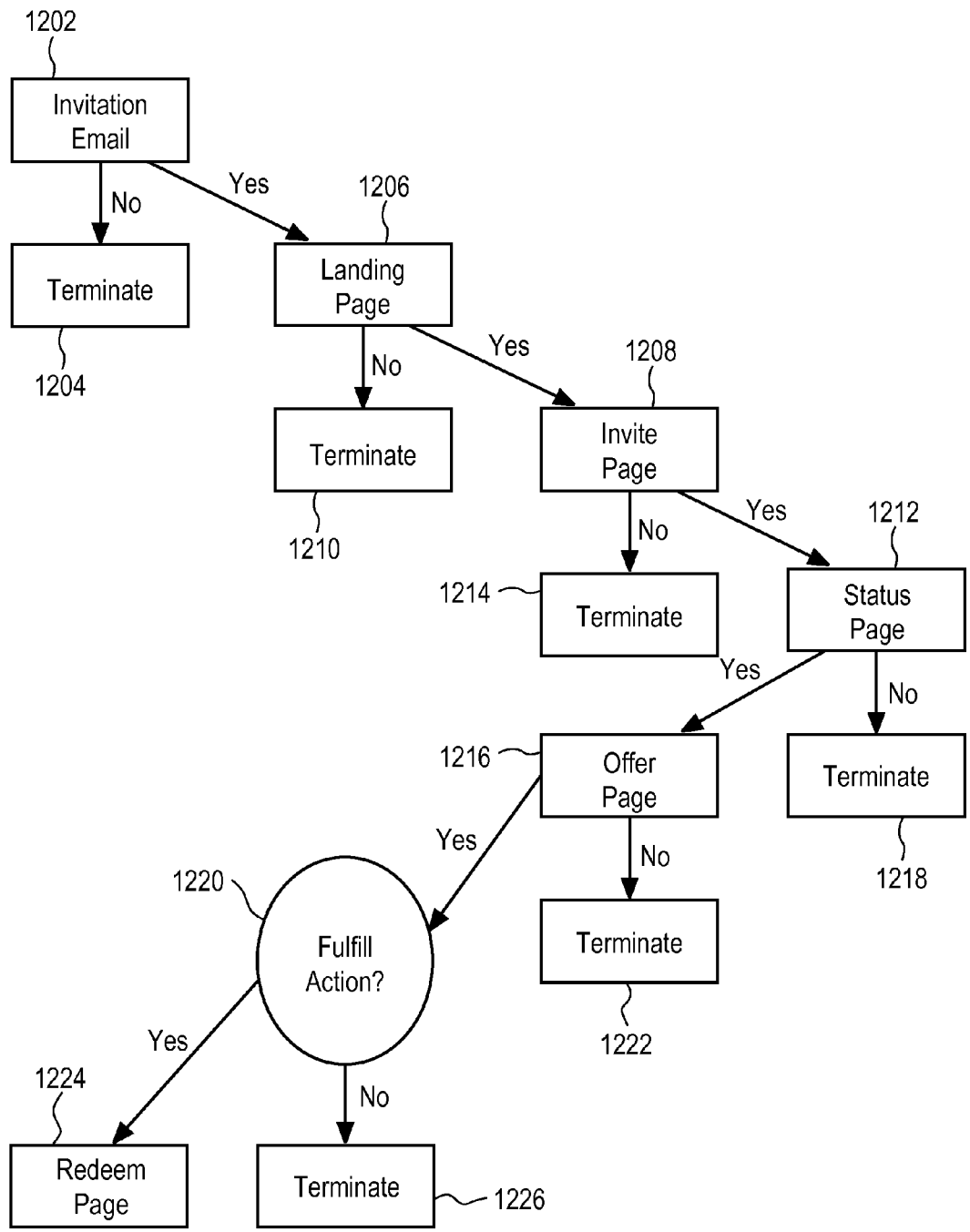
FIG. 12 is a binary decision tree representing a simplified trial flow for e-mail and web mediums.

The data acquired in the various viral marketing trials is independent of the mediums used in the invitation process 210 and the client. The data accumulated and stored in the viral marketing server 10 aids in optimizing the viral marketing effort. The various web pages disclosed above and any other media utilized to implement the viral marketing trials may contain appropriate links to a trials database 12 to store the appropriate data in database. The salient features of the data are the parent-child relationships, the Trial Code specifying the trial that the customer or user was presented, and a number of Event Codes which describe a customer's traversal through the trial flow. By the term event code, it is meant that some data is collected and/or stored that indicates that an event, such as opening an e-mail, sending an invitation, clicking on a link, registering for the program, etc, has occurred. This data may be stored in many different formats, thus, it should be understood that while some formats for data storage of event codes is described herein that such data formats are not exclusive and should not be considered limiting unless otherwise specified. A simplified trial flow for e-mail and web mediums is shown for example in FIG. 12. FIG. 12 depicts a binary decision tree which may be used to represent any trial flow utilizing an invitation e-mail, as shown, for example, in FIG. 2.

As shown for example in FIG. 12, the method of optimizing viral marketing includes an invitation step 1202 wherein an invitee is invited by an existing user or seed member to participate in a viral marketing trial via an invitation e-mail containing a link to a landing page. If the invitee elects to not participate by failing to click the link on the invitation e-mail, the process is terminated in step 1204. Alternatively, the invitee may accept the invitation by clicking on the link and proceeding to the landing page 1206 for registration. As shown, in Table 1 below, declining the invitation can be represented in binary fashion by the code 000000 which may be assigned event code 1, whereas acceptance of the invitation can be represented by binary code 100000 which may be assigned event code 2. Upon accepting the invitation, the invitee is presented with a landing page 1206 whereby the invitee may register with the system. Registration can be represented by binary code 110000 which may be assigned event code 3. If an invitee elects to register, the registered invitee may then act as a seed member and thus proceeds to an invite page 1208 configured to facilitate invitation of acquaintances. Election to invite acquaintances can be represented by binary code 111000 which may be assigned event code 4. If the invitee elects to not register with the system, the process is terminated in step 1210 and no event code is assigned to this action. The statement that "no event code is assigned" is shorthand for indicating that as a result of the termination of the process the data and event code will be finalized indicating that the user completed the previous step (assigned 110000), but not the current step (assigned 111000), and thus they remain at the previous step and the event code for completing that previous step is event code 3. Thus, while stated herein as "no event code is assigned" for failure to complete a step, in actuality the same event code is retained as the previous step.

If the user elects to invite acquaintances, the user may then be presented with a status page in step 1212 which page contains a link to an offer page. If the user elects to not invite acquaintances, the process is terminated in step 1214 and no event code is assigned to this action. When the user clicks on the link to the offer in status page, the user is transferred to the offer page in step 1216. The action of clicking on the link to the offer page can be represented by binary code 111100 and assigned event code 5. If the user does not click on the link to the offer page, no event code is assigned and the process is terminated in step 1218. When presented with the offer page, the user can elect to purchase the product or service and proceed to the fulfill action step 1220 or elect to not purchase the product or service and have the process terminated in step 1222. Acceptance of the offer can be represented by binary code 111110 which may be assigned event code 6. If the user fulfills the action requirements of the trial, the redemption step 1224 then occurs wherein the user is presented with a redemption page. Otherwise the process is terminated in step 1226. Completion of the action requirement can be represented by binary code 111111 which may be assigned event code 7.

| Binary String | Event Code | Description (Last Step) |
|---|---|---|
| 000000 | 1 | Click Link 1 (i.e. Invitation Declined) |
| 100000 | 2 | Click Link 1 (i.e. Invitation Accepted) |
| 110000 | 3 | Registered |
| 111000 | 4 | Invite |
| 111100 | 5 | Click Link 2 |
| 111110 | 6 | Complete Offer |
| 111111 | 7 | Complete Action |

The invitation process 210 is fundamental to trial flows in any media. The invitation process 210 shown in FIG. 13 is not media specific and therefore demonstrates that the trial flow for any particular media is a manifestation of the invitation process, possibly requiring different web processes and different nomenclature depending on the media.

Figure 13:
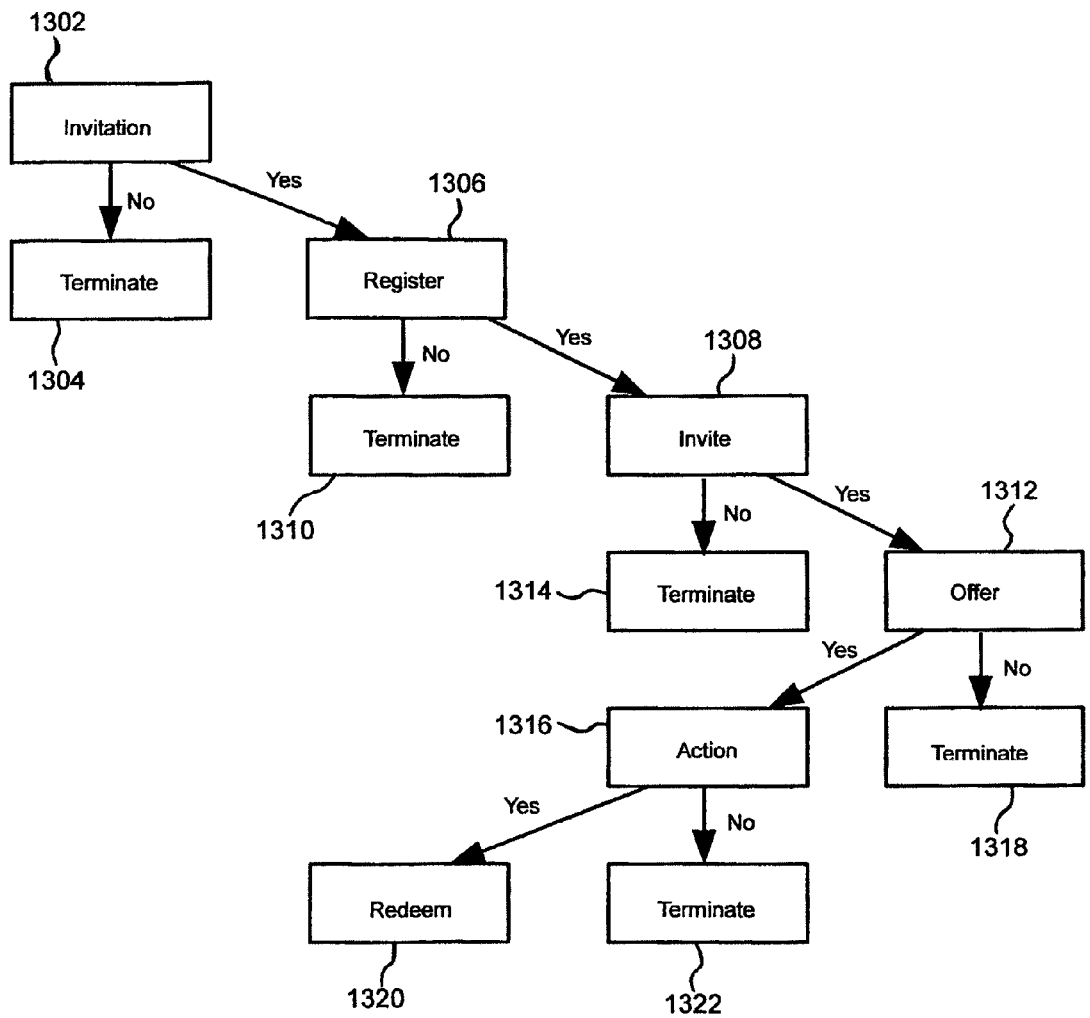
FIG. 13 is a fundamental binary decision tree of the invitation process.

FIG. 13 demonstrates the trial flow in a process wherein the invitation process 210 is implemented utilizing a media other than e-mail. The method of optimizing viral marketing includes an invitation step 1302 wherein an invitee is invited by an existing user or seed member to participate in a viral marketing trial. As shown, in Table 2-below, declining the invitation terminates the process in step 1304, which termination can be represented in binary fashion by the code 00000 which may be assigned event code 1. Acceptance of the invitation can be represented by binary code 10000 which may be assigned event code 2. Upon accepting the invitation, the invitee is presented with a registration step 1306 whereby the invitee may register with the system. Registration can be represented by binary code 11000 which may be assigned event code 3. If an invitee elects to register, the registered invitee may then act as a seed member and is thus proceeds to an invitation step 1308. Election to invite acquaintances can be represented by binary code 11100 which may be assigned event code 4. If the invitee elects to not register with the system, the process is terminated in step 1310 and no event code is assigned to this action. If the user elects to invite acquaintances, the user may then be presented with an offer in step 1312 to purchase products or services. If the user elects to not invite acquaintances, the process is terminated in step 1314 and no event code is assigned to this action. When presented with the offer, the user can elect to purchase the product or service and proceed to the action step 1316 or elect to not purchase the product or service and have the process terminated in step 1318. Acceptance of the offer can be represented by binary code 11110 which may be assigned event code 5. If the user fulfills the action requirements of the trial, the redemption step 1320 then occurs, otherwise the process is terminated in step 1322. Completion of the action requirement can be represented by binary code 11111 which may be assigned event code 6.

| Binary String | Event Code | Description (Last Step) |
|---|---|---|
| 00000 | 1 | Invitation Declined |
| 10000 | 2 | Invitation Accepted |
| 11000 | 3 | Registered |
| 11100 | 4 | Invite |
| 11110 | 5 | Complete Offer |
| 11111 | 6 | Complete Action |

Table 1 has seven Event Codes and Table 2 has six. For any media, additional Event Codes may be needed to support trial flows in that medium, e.g. Event Code=5 in Table 1. Moreover, the steps in the invitation process may adopt names that are native to the media, e.g. Event Codes=1 & 2 in Table 2. One embodiment of a data model may correlate the occurrence of an event with the customer who completed the event, the trial in which the customer participated and the participant that invited the customer who completed the event. The data model in such cases is represented in Table 3 as follows:

TABLE 3

Data model for the invitation process and manifestations of the invitation process.

| CustomerID | ParentCustomerID | TrialCode | EventCode |
|---|---|---|---|
| cID_1 | pID_1 | tc_1 | ec_1 |
| cID_2 | pID_2 | tc_2 | ec_2 |
| cID_3 | pID_3 | tc_3 | ec_3 |
| ... | ... | ... | ... |

Table three contains a title row divided into columns which contain text identifying the data contained in the columns below. Each row other than the title row contains data relating to a specific user of the viral marketing system. Each CustomerID data, cID_1, cID_2, cID_3, etc. is a unique identifier for any potential user that was sent an invitation. The ParentCustomerID data, pID_1, pID_2, pID_3, etc., is the CustomerID of the inviter of the user and is maintained as data to help establish the parent-child relationships of the users. The TrialCode data, tc_1, tc_2, tc_3, etc. is number identifying a trial flow comprised of specific trial attributes. The EventCode data ec_1, ec_2, ec_3, etc. is a number identifying the last traversal point in the trial flow of the customer associated with the CustomerID. The data represented in table 3 is stored in memory 12 and preferably in a relational database 14 of the system.

As explained above, user interaction with trials produces data such as that shown in table 3. The data is analyzed as "Metrics" and used to determine the appropriate configuration of a trial definition. "Metrics" are monitored in order to infer the effect of trial variations, i.e. metrics are used as an indicator of the relative success of the trials. The fundamental business process for pursuing the critical business objectives is using metrics to choose the correct trial configuration.

"Metrics" are used to evaluate or monitor the invitation process 210 and the web processes 220, and may be evaluated or monitored in (near) real time. The metrics, and the processes used to compute the metrics, comprise an analytical suite 22. Each metric is designed to monitor characteristics of trials 201-206 that are an important part of perpetuating the invitation process 210 and motivating user actions. These metrics are intended to, and usually will, have different values for each individual trial. The metrics allow a trial's impact to be compared to the impact of other trials. The trials that are relatively good performers as determined by analysis of the metrics are used as substitutes for relatively poor performing trials after enough data has been generated to make a compelling case for such substitutions. Substitutions are made to achieve the business objectives (maximize the number of participants in the invitation process, maximize the number and/or amount desired consumer actions, and minimize the outlay required for both).

A number of metrics may be utilized to monitor important characteristics of the invitation process in (near) real time. The metrics include an invitation metric, an incentive metric, a page views metric, a page conversion rate metric and an offspring count metric. Definitions, descriptions, comments, and examples of each metric are described below.

The invitation metric (I) for a trial is defined by the quotient of the number of invitations sent for the trial divided by the number of registrations for the trial. Each trial 201-206 will thus have its own invitation metric indicative of how well the invitation including an identification of both the motivator and the actions is able to induce persons to register with the system. In the above data examples wherein certain actions are represented by binary data entries, the invitation metric can be computed by dividing the total number of invitations sent for a trial by the number of binary data entries having 1's in the two least significant digits (i.e. 110000, 111000. 11100, 11110, or 11111. For example, suppose there are two trials A and B. If 500,000 e-mail invitations were sent for trial A and 50,000 registrations occurred, the invitation metric $I_A$ for trial A would be ten. If 200,000 e-mail invitations were sera and 40,000 registrations occurred for trial B, the invitation metric $I_B$ for trial B would be five. Thus the lower the invitation metric for a trial, the more effective the invitation utilized in that trial is perceived to be.

The Incentive Matrix is a matrix created for each trial that relates the number of registrations against the number of offers and is grouped by Inviter and Invitee. An example of an incentive matrix is shown below. The incentive matrix grouped by Inviter & Invitee can be generated from the binary data by forming a table comparing the number of data elements for the trial with ones in the two least significant digits by the number of data elements with ones in the four least significant digits.

Example

|  | 0 Offers | 1 Offers | 2 Offers | 3 Offers | 4 Offers | 5 Offers | 6 Offers | Total |
|---|---|---|---|---|---|---|---|---|
| 0 Refs | 100012 | 0 | 0 | 0 | 0 | 0 | 0 | 100012 |
| 1 Refs | 40008 | 210 | 130 | 0 | 0 | 0 | 0 | 40348 |
| 2 Refs | 20010 | 230 | 160 | 0 | 0 | 0 | 0 | 20400 |
| 3 Refs | 10040 | 160 | 50 | 5 | 0 | 0 | 0 | 10255 |
| 4 Refs | 500 | 260 | 190 | 100 | 10 | 0 | 0 | 1060 |
| 5 Refs | 240 | 120 | 40 | 10 | 5 | 5 | 0 | 420 |
| 6 Refs | 160 | 20 | 10 | 10 | 2 | 2 | 1 | 205 |
| Total | 170970 | 1000 | 580 | 125 | 17 | 7 | 1 |  |

The page views metric can be grouped by trial and by webpage viewed and represents the number of times a page in the web process is viewed. From the binary data collected as described above with regard to FIG. 12, the page views metric for the landing page would be generated by counting all of the data entries related to the trial that have a one in the least significant digit. The page view metric for the invite page would be computed by counting the number of data entries with ones in the two least significant digits. The page view metric for the status page would be computed by counting the number of data entries with ones in the three least significant digits. The page view metric for the offer page would be computed by counting the number of data entries with ones in the three least significant digits. The page view metric for the offer page would be computed by counting the number of data entries with ones in the four least significant digits. The page view metric for the redemption page would be computed by counting the number of data entries with ones in all digits. The higher the page view metric for a page the more effective the previous page was in motivating the desired actions.

The page conversation rate metric is maintained for each trial and for each page within the trial. The page conversion rate metric is defined by the quotient of the number of registrations divided by the number of page views. Thus, for the invitation page in the example shown in FIG. 12, the page conversion rate metric can be computed from the binary data collected in table 1 by dividing the number of data elements with one in the two least significant digits by the number of data elements with one in the least significant digit.

The offspring count metric is defined for each trial. The offspring count metric is computed by subtracting the number of seed users (anyone sending an invitation) from the number of registrations for the trial. From the binary data collected as described above with regard to FIG. 12, the offspring count metric can be computed by subtracting the number of data elements in the row with the lowest parentID value for a trial having ones in the three least significant digits from the number of data elements having ones in the two least significant digits.

As mentioned previously, the media that are employed to carry out the invitation process 210 can vary. Preferably, for all media utilized to implement the invitation process 210 it is possible, in principle, to construct a delivery platform that supports the invitation process 210. Thus, it is within the scope of the disclosure for the disclosed system and method to utilize any media and any delivery platforms that outputs the data defined/described above.

While the described system and method envision that after the metrics are measured, human intervention is required to optimize a trial definition, it is within the scope of the disclosure for automated analysis utilities to be developed and utilized to optimize the trial definition without human intervention.

The objects of various embodiments of the disclosed system and method of optimizing a viral marketing program may be to do one or more of the following: to maximize the number of registrants to the program based on invitations from friends or members of their social network; to maximize the number of monetary actions completed by users; and/or, to minimize the cost associated with the motivator. Each of these desired objects work in concert and present a yield optimization problem, which is solved in the disclosed method and system by utilizing tests (trials) to determine the best scenario for optimizing the viral marketing program.

Based on the disclosure, it should be recognized that, registrants come at the expense of monetization. The cost of the motivator influences the maximization of the number of registrants. The difficulty in obtaining monetization influences the cost of the motivator.

The number of registrants that a trial process generates is affected by several elements, attributes or issues including, but not limited to, the invitation type and copy presented from friends to friends, the "type" of landing page and the copy presented thereon, (for example, "parent" users and "children" (viral) users may be presented with different landing page steps, the value of the motivator ($250 is better then $25), the framing of the motivator (does the motivator appear believable) and the framing of the required actions. Modification of any of these levers or attributes can modify the effectiveness of a trial. For instance, one trial may frame the required actions as sending e-mail invitations to join a trial to at least five friends who join the trial while a second trial may frame the action as sending e-mail invitations to at least one hundred friends who join the trial. Assuming all other attributes of the trial are the same, it is very likely that the trial with the required action being sending e-mails to five friends who join will result in more registrants.

In addition to the metrics described above that measure the effectiveness of a trial to obtain registrant's, there are other metrics related to the effectiveness of a trial to produce high registration rates. The percentage of invites viewed is a metric produced by collecting data about the e-mail open rate which tests the effectiveness of the e-mail subject line in possibly producing registrants. The percentage of invites acted on is a metric generated by collecting data on the e-mail hyperlink click rate which tests the effectiveness of the body copy of the e-mail in a trial to generate registrants. The Landing page conversion rate is a metric generated by collecting data on the number of people that get from the landing page to the next step and is reflective of the trials ability to generate registrants. The Number of invites sent by a registered user is a metric that is generated by collecting data on the number of invitations each user sends to members of their social network and is reflective of the trials ability to generate registrants.

The monetary action is how a provider of the system and method of optimizing a viral marketing program may be compensated for their efforts. This is ultimately what the advertiser wants a user to do and is willing to compensate another or incur their own costs to induce the users to do. This could be as simple as clicking on a link, or as complicated as filling out a twenty page form and putting in a credit card for a $20,000 purchase. Attributes of a trial that affect the monetary action include where/when the offer is presented to the user, whether the offer is a desirable product/service (e.g. it is easier to get someone to buy fresh flowers than dead flowers), whether the offer requires multiple steps, whether the offer requires a purchase (e.g. with a credit card) and whether the offer requires providing personally identifiable information.

In addition to the metrics described above that measure the effectiveness of a trial to induce a user to complete a monetary action, there are other metrics related to the effectiveness of a trial to induce a user to complete a monetary action. The percentage of people who completed the monetary action is a metric that is generated by collecting data on how far along the process each of the invitees proceeds.

Required actions are anything that is required from the user to receive their motivator. This usually includes the monetary action but it doesn't have to. This could be as simple as sending some e-mails to their friends, or as difficult as signing up at the site, completing a $3^{rd}$ party marketing offer using a credit card, and going outside, taking a picture of themselves jumping through a hoop and sending it to some designated site. Among the attributes of a trial that influence the effectiveness of a required action are the number of steps in the action, the amount of personal information required for the action, whether the monetary action has a high rate of conversion/acceptance, whether the action is easy to do (hard for someone to jump through a hoop if they don't have a hoop) and the framing of the required actions. The percentage of users that complete all the required actions and receive their motivator is a metric for determining the effectiveness of the required actions for a trial.

Changing any of the attributes of a trial may result in changes in the effectiveness of the other attributes of a trial. As an extreme example, suppose in one trial $1 million was given to everyone that signed up with their e-mail address (monetary action) and got one friend to sign up (action requirement). Inevitably, all the metrics for the effectiveness of obtaining registrants and completion of the monetary actions would be through the roof. The adoption rate would be extreme. However, so would the associated cost of the motivator. Thus the cost of the trial would be maximized which is exactly the opposite of what is desired.

Consider the same example, where attributes that affect the registration rate are kept the same, but the monetary action is changed. For example, assume that instead of the monetary action being that the user has to sign up using their e-mail address, the monetary action is that the user needs to purchase a well known product for $1000 using their credit card. In this case, there would still be some level of adoption, but there wouldn't be quite as many people sign up and therefore fewer motivator's would need to be paid reducing the cost of the viral marketing program.

By trying/testing different versions of the attributes or levers that affect each of the various components, the right mix of attributes can be found that allows maximization of the number of registrants, maximization of the number of registrants completing the monetary action and minimization of the cost associated with the trial. Because the factors change by advertiser or client (product, motivator allocation, etc.) every implementation of a viral marketing program is different requiring different trials to be conducted to optimize the marketing program. However, the business method for coming up with the right combination of attributes to achieve the desired end goal is the same.

Using the levers or attributes described above, there are many different scenarios that can occur during trials to optimize a viral marketing program. For example, assume trial 1 includes a landing page that has a $20 motivator, the landing page conversion rate (metric) is 10%, each user sent an average of two invitations, the monetary action is in described in the process, and the site is not generating at least as many registered users from period to period. Assume further that trial 2 includes a landing page that has a $250 motivator, the landing page conversion rate (metric) is 75%, each user sent an average of 20 invitations, the monetary action is hidden and the site is generating about the same number of registered users each period. Even if trial 1 is making more money, it isn't an optimized yield, because it is not sustainable. Eventually there will be zero registered users and thus zero dollars. Ultimately, the yield optimization problem considers the following equations:

revenue per registered user*registered users=revenue generated cost per registered user*registered users=cost incurred Optimization is obtained by modifying attributes of trials so that a scenario where revenue generated (A) minus cost incurred (B) is maximum positive, while the number of registrants per period is at least constant (at least the same number of registrants for the same period of the prior week).

As previously stated, embodiments of the disclosed viral marketing system utilize multiple trials in order to collect data that may be utilized to facilitate optimization of the viral marketing program according to three business objectives: 1) maximizing the number of participants in a program; 2) maximizing the number and/or amount of desired consumer actions for the program; and 3) minimizing the outlay required for business objectives 1 and 2. Many of the embodiments of the disclosed system and advantageously utilize the above three identified business objectives as heuristics for simplifying a more difficult optimization problem, i.e. "Profit Maximization." The embodiments of the disclosed system and method advantageously utilize trials as an effective way to simultaneously estimate/establish key parameters that are required as inputs to the approximation to the optimization problem.

The description that follows is an embodiment of a novel pricing method that is used to optimize viral marketing campaigns according to the principle of profit maximization: Total Revenue−Total Cost. For viral marketing campaigns, Total Revenue can be determined utilizing the following equation:

Total Revenue=$k_{mA}$price$_{mA}$ where $k_{mA}$ is the total number of monetization events and price$_{mA}$ is the price of each monetization event (for trial A).

The Total Cost of a viral marketing campaign can be determined utilizing the following equation"

Total Cost=$k_{aA}$price$_{aA}$, where $k_{aA}$ is the total number of fulfilled action requirements and price$_{aA}$ is the price of each action requirement (for trial A). Unfortunately, at any given time before the end of a viral marketing campaign, Total Revenue and Total Cost are not known. Profit maximization embodiments of the disclosed system and method for optimizing viral marketing campaigns advantageously utilize one or more of a number of metrics related to Total Revenue and Total Cost to facilitate optimization of a viral marketing campaign based on results of trials. Those skilled in the art will recognize that other embodiments of the system and method that seek to optimize aspects other than profitability, such as contacts generated, of a viral marketing program utilize different data and metrics that reflect the effectiveness of a trial to generate the desired aspect.

As previously mentioned certain embodiments of the disclosed system and method facilitate profit maximization of a viral marketing program and thus attempt to predict revenue and costs for trials. The expectation of revenue (E(revenue)) is as follows:

$E(\text{revenue}) = \Sigma p(\text{monetization events}=k_m)k_m\text{price}_m$, where p is the probability that the number of monetization events is $k_m$. The probability p can be expressed in terms of the number of registered users, $k_r$:

$$p(\text{monetization events} = k_m) = \sum_{kr \geq km} p(\text{monetization events} = k_m | reg\ users = k_r)p(reg\ users = k_r)$$

Substitution yields . . . :

$$E(\text{revenue}) = \sum p(\text{monetization events} = k_m)k_m\text{price}_m$$
$$= \sum \sum_{kr \geq km} p(\text{monetization events}$$
$$= k_m | reg\ users = k_r))p(reg\ users = k_r)k_m\text{price}_m$$

A similar derivation is given for the expectation of cost (E(cost)):

$E(\text{cost}) = \Sigma p(\text{action requirements}=k_a)k_a\text{price}_a$, where p(action requirements=$k_a$) is the probability that the number of action requirements is $k_a$. The probability that the action requirements will be equal to a value p(action requirements=$k_a$) can be expressed in terms of the number of registered users, $k_r$:

$$p(\text{action requirements} = k_a) = \sum_{kr \geq ka} p(\text{action requirements}$$
$$= k_m | reg\ users = k_r)p(reg\ users = k_r)$$

Substitution yields . . . :

$$E(\text{cost}) = \sum p(\text{action requirements} = k_a)k_a\text{price}_a$$
$$= \sum \sum_{kr \geq ka} p(\text{monetization events}$$
$$= k_a | reg\ users = k_r)p(reg\ users = k_r)k_a\text{price}_a$$

Thus, profit maximization entails maximization of the difference E(revenue)−E(cost).

The relationship between profit maximization and the three business objectives is derived from the fact that if the price of the monetization event (price$_m$) and the price of the action (price$_a$) are maintained as constants, (as is envisioned within each specific trial) then the expected revenue can be mathematically modeled by the equation:

$$E(\text{revenue}) = \sum p(\text{monetization events} = k_m)k_m\text{price}_m$$
$$= \text{price}_m \sum p(\text{monetization events} = k_m)k_m$$

-continued $$= \text{price}_m E(\text{monetization events})$$

$$\text{price}_m(\text{\# of monetization events per registered user})(\text{\# of registered users})$$

A similar derivation is given for the expectation of cost:

$$E(\text{cost}) = \sum p(\text{action requirements} = k_a) k_a \text{price}_a$$

$$= \text{price}_a \sum p(\text{action requirements} = k_a) k_a$$

$$= \text{price}_a E(\text{action requirements})$$

$$\text{price}_a(\text{\# of action requirements per registered user})(\text{\# of registered users})$$

In both cases, the approximations (following the "≈") are known prior to completion of the viral marketing program because all of the components of the approximation are known. In both cases, estimating the probabilities (for monetization events, action requirements, and the number of registered users) is highly non-trivial, making any approximating heuristics valuable.

Profit maximization is the maximum of the difference between the expected revenue and the expected cost, i.e. E(revenue)−E(cost). Where the expected revenue can be approximated by the price of the monetization event times the number of monetization events per registered user times the number of registered users, i.e. E(revenue)≈$\text{price}_m$ (number of monetization events per registered user)(number of registered users). The expected cost can be approximated by the price of the action requirements times the number of action requirements per registered user times the number of registered users, i.e. E(cost)≈$\text{price}_a$, (number of action requirements per registered user)(number of registered users). The number of monetization events per registered user varies by trial as does the number of action requirements per registered user and the number of registered users. Thus; it is reasonable to expect that the difference E(revenue)−E(cost) varies by trial, suggesting the reasonableness of pursuing a maximum difference, E(revenue)−E(cost), over all trials.

Figure 14:
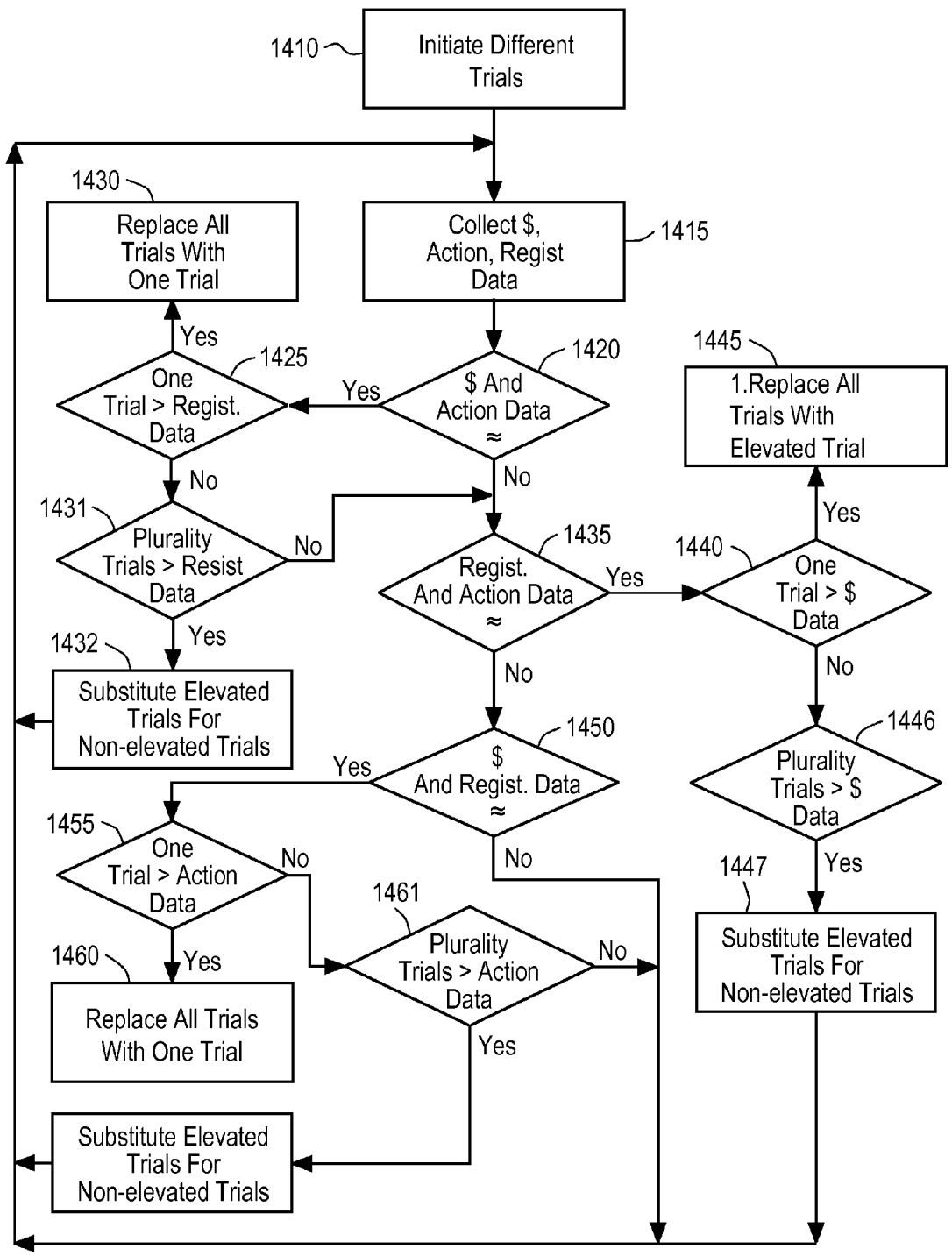
FIG. 14 is a flow diagram of one embodiment of a method of optimizing a viral marketing program.

Thus, as shown, for example, in FIG. 14, according to one embodiment of the system and method for optimizing a viral marketing program, several trials (e.g. Trials A-D) each having differently defined monetization events and differently defined action requirements are initiated 1410. While this initiation of several trials 1410 is illustrated as including initiation of four trials A-D, it is within the scope of the disclosure for a plurality of trials to be initiated including fewer trials and more trials so long as at least two trials are initiated. Based on the description above, it should be understood that each initiated trial includes at least one attribute that differs from each of the other initiated trials.

For each trial data is collected 1415 indicating the number of monetization events per user, the number of action requirements per user and the rate at which participants become registered users. It is determined 1420 from the collected data whether the number of monetization events per user and the number of action requirements per user appears to be more/less equal for the trials. If so, it is determined 1425 from the collected data whether one of the plurality of trials exhibits an elevated registration rate. If so, all of the plurality of trials are replaced with the trial with the elevated registration rate 1430, in order to optimize the viral marketing program.

If, it is determined that any action and monetization data are approximately equal in step 1420, and it is determined that the no single trial exhibits elevated data values for the registration rate in step 1425, it is then determined in step 1431 whether a plurality of the trials exhibit elevated data values for the registration rate. If so, then the trials exhibiting elevated data values for the registration rate are substituted substantially equally for the trials not exhibiting elevated data values for the registration rate in step 1432 and additional data is collected 1415 for the remaining trials.

If step 1420 indicates that the monetization and action data for all trials is not approximately equal, or step 1431 indicates that a plurality of trials do not exhibit elevated registration rates, it is determined in step 1435 whether the collected data indicates that for the trials the rate at which participants become registered users appears to be more/less equal, and the number of action requirements per user appears to be more/less equal. If so, it is determined in step 1440 whether one trial exhibits an elevated number of monetization events per user relative to the other trials. If so, all of the plurality of trials are replaced 1445 with the trial with the elevated monetization events in order to optimize the viral marketing program.

If, it is determined that the registration and action data are approximately equal in step 1435, and it is determined that the no single trial exhibits elevated data values for the monetization rate in step 1440, it is determined in step 1446 whether a plurality of the trials exhibit elevated data values for the monetization rate. If so, then the trials exhibiting elevated data values for the monetization rate are substituted substantially equally for the trials not exhibiting elevated data values in step 1447 and 1462 and additional data is collected 1415 and additional data is collected 1415 for the remaining trials.

If step 1435 indicates that the registration and action data for all trials is not approximately equal, or step 1446 indicates that a plurality of trials do not exhibit elevated monetization rates, it is determined in step 1450 whether the collected data indicates that for the trials the rate at which participants who become registered users appears to be more/less equal, and the number of monetization events per user appears to be more/less equal. If so, it is determined in step 1455 whether one trial exhibits an elevated number of action requirements per user. If so, all of the plurality of trials are replaced with the trial with the elevated number of action requirements per user 1460 in order to optimize the viral marketing program.

If it is determined in step 1455 no single trial exhibits elevated data values for the action rate in step 1455, it is determined in step 1461 whether a plurality of the trials exhibit elevated data values for the action rate. If so, then the trials exhibiting elevated data values for the action rate are substituted substantially equally for the trials not exhibiting elevated data values for the action rate in step 1462 and additional data is collected 1415 for the remaining trials.

Finally, if the collected data indicates that the rate at which participants become registered users appears to be more/less equal, the number of action requirements per user appears to be more/less equal, and the number of monetization events per user appears to be more/less equal, then take no action and additional data is collected 1415.

Figure 15:
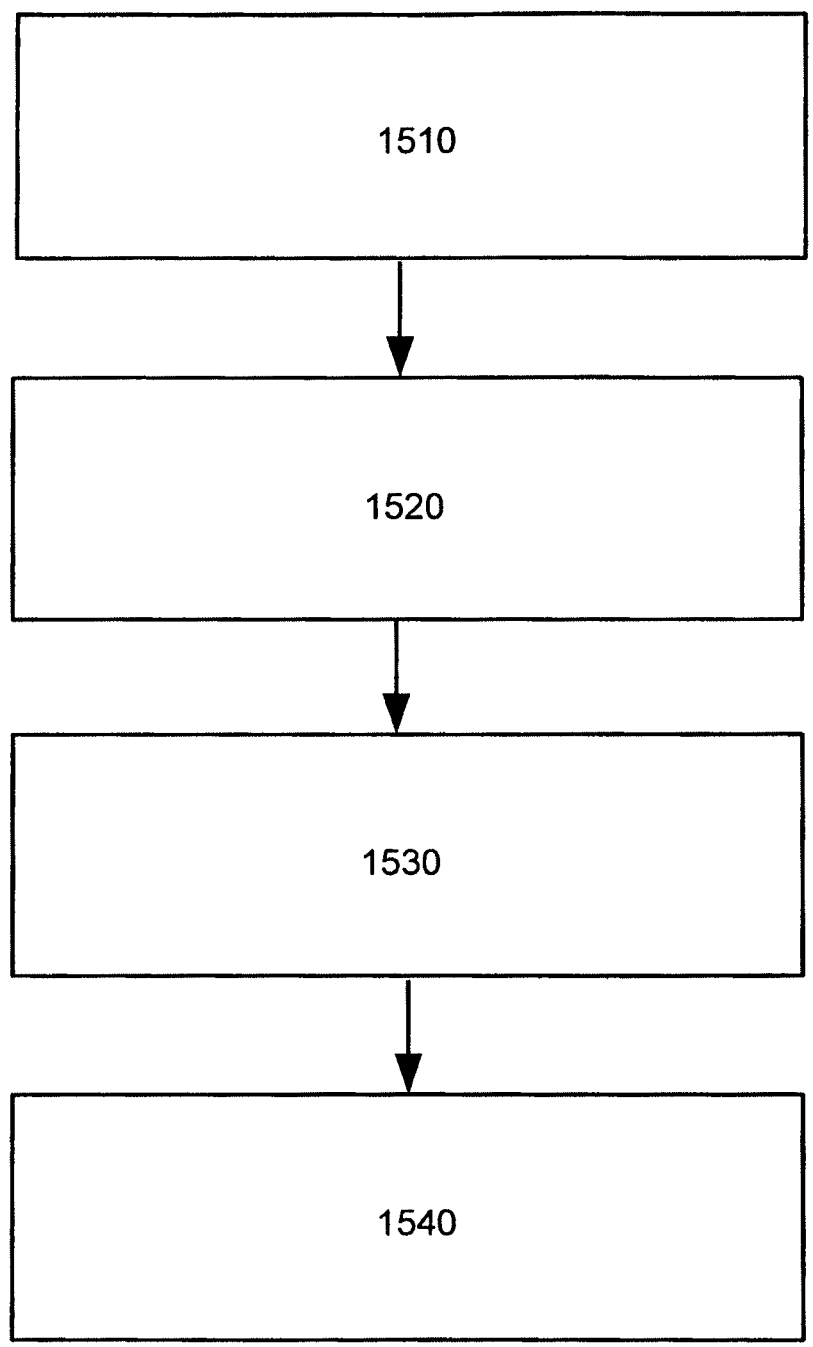
FIG. 15 is a flow diagram of a generic embodiment of optimizing a viral marketing program.

As shown, for example, in FIG. 15, in one embodiment of the disclosed method 1500 of optimizing viral marketing programs, a plurality of trials each having at least one attribute differing from each of the other of the plurality of trials are initiated 1510. Raw data is collected 1520 for all users involved in each specific trial. The collected raw data is converted to a metric for each trial 1530. The metrics are utilized to make decisions involving the effectiveness of each trial 1540. The raw data may be converted to one or more of the metrics described hereinabove or to other metrics reflective of the effectiveness of a viral marketing program. For example, assume that three trials A, B and C are initiated for a viral marketing program, each of which has a different monetization event and action requirement in step 1510. If, for trial A the monetization per user appears to be between $0.25-$0.30, for trial B the monetization per user appears to be between $0.24-$0.31 and for trial C the monetization per user appears to be between $0.27-$0.29, and there is little to no difference between the value of the Incentive Matrix for the trials in the cost of action requirements fulfillments, but the invitation metric for trial A is noticeably elevated relative to the invitation metric for trials B and C and the offspring metric for trial A is noticeably elevated relative to the offspring metric for trials B and C, then substitute trials B and C with trial A in order to optimize the viral marketing program.

In accordance with an embodiment of the disclosed method 1500, two trials A and B each having different monetization events and action requirements are initiated in a viral marketing program in step 1510. Data is collected regarding how each invited user reacts with the trial in which they are participating in step 1520 and from the data for each trial metrics for the trial are generated in step 1530. Evaluation of the metrics for each trial indicates that the offspring metric for trials A and B are more/less equal and all other metrics are inconclusive due to small or no apparent differences. However, the monetization per user for trial A appears to be in the range of $1.45-$1.50 and the monetization for trial B appears to be in the range $0.65-$0.85. Therefore, based on the evaluation of the metrics for each trial, trial B is discontinued and replaced with trial A in order to optimize the viral marketing program.

In the previous examples key parameters were obtained by implementing trials. The parameters were used to make heuristic calculations which are intended to reflect the underlying profit maximization problem.

Utilizing the disclosed system and method, users may create a sustainable flow of high-quality leads and customers, establish a productive and measurable viral marketing channel, evaluate and optimize viral marketing performance with data, leverage the marketing power and influence of consumer social networks, establish a private-label, online social environment for effective brand-building and use existing assets to create new customers, leads, and brand influencers. The utilization of viral marketing analytics facilitates the creation, performance monitoring, and optimization of viral marketing programs that offer predictable results, sustainable virality, and the ability to leverage viral results to drive business goals. Utilizing the disclosed system and method marketers can build, deploy, and scale integrated private-label viral marketing programs, perform sophisticated multivariate analysis of creative content and persuasive elements, automate targeted e-mail marketing initiatives, and more. Among the features which may be utilized alone or in combination in embodiments of the disclosed system and method are publishing tools, content testing and optimization, e-mail management, reporting and a social network tool set.

Embodiments of the disclosed system and method may include a hosted, web-based technology platform that enables users to quickly create, optimize, and scale viral marketing programs. Users may use the technology platform to present branded, socially engaging online experiences optimized to drive specific marketing objectives. Embodiments of the disclosed system and method may generate new, highly targeted leads, grow sales, improve brand awareness, build marketing databases, spread marketing messages, increase online and offline traffic and/or drive consumers to ecommerce, downloads, and other calls-to-action. The hosted, web-accessible platform enables marketers to create sustainable, profitable, private-label viral programs using analytics and testing methodologies.

The technology platform may include features designed for easing the use of the disclosed system and method. The technology platform may include configurable flexible viral templates and modules with customer specific brand, messaging, and viral offer, experience, or content. The technology platform may also include automated optimization of the viral marketing program. This automated optimization may be accomplished using multivariate or A/B testing to find the persuasive elements that motivate consumers. As shown, for example, in FIG. 16, one embodiment of a hosted web based technology platform 1610 includes a micro-site layer 1620, an analytics layer 1650, and a communications layer 1680.

The micro-site layer 1620 manages the viral process, content, and overall user experience. This management may include providing publishing tools 1625, social networking tools 1630 and program content tools 1635. The publishing tools 1625 may include a web-based interface to facilitate rapid creation, deployment, and management of viral programs. The social networking tools 1630 may be configured to tap the power of social networks by allowing users, with a few clicks, to share offers by importing their existing e-mail address books, then track their friends' participation, such as shown for example in FIG. 11. The program content tools 1635 may facilitate the integration of viral programs into existing customer websites or alternatively facilitate publishing the viral programs as hosted micro-sites.

The publishing tools 1625 may include one or more of the following either alone or in combination: a publishing dashboard 1626; configurable templates 1627; custom branding 1628; and interaction tracking 1629. The publishing dashboard 1626 may be an easy-to-use web-based interface for rapid creation, deployment, and management of viral programs. The configurable templates 1627 may assemble programs by configuring templates that contain all viral functionality. Custom branding 1628 may be implemented utilizing templates that can be customized with brand identity elements (e.g. logo, colors, fonts) to create private-label viral programs. For example, the system can trigger e-mails or other action when users complete defined steps or actions to implement interaction tracking 1629 by including image pixels in e-mails or other e-mail tracking devices to indicate when an invitation e-mail has been delivered, viewed and/and or forwarded. The system can also place clickable links in the e-mail that utilize URLs that contain identifiers indicating the source e-mail from which a linked web page was accessed. Upon viewing a webpage, session cookies may be set to identify user interactions with the webpage. The publishing tools 1625 may configure program templates with client brand and identity, develop creative assets, leverage existing client assets and provide creative direction, design and copywriting as necessary, and/or guide clients through simple integration processes The social networking tool set 1630 may include a friend to friend referral tool 1631 for sending friend-to-friend referrals from within the program site, an importation tool 1632 for importing address books and tracking tools 1633 for tracking referrals. The referral tool 1631 allows users to share viral programs with friends, so they share more and stay engaged longer. Users can send messages to contacts from existing address books from all the major e-mail providers utilizing the importation tool 1632. The tracking tool 1633 allows a user to remain apprised of whether their friends have signed up or taken other actions.

The analytics layer 1650 of embodiments of the disclosed system may include a viral analytics function 1655, an optimization engine 1660 and a reporting function 1665. The analytics layer 1650 manages the viral science and analytics components of the disclosed system including the viral analytics 1655, the optimization engine 1660 and reporting functions 1665.

The disclosed system and method may automatically track and analyze consumer behavior in real-time to identify the best offers and content as a component of the viral analysis function 1655. The optimization engine 1660 may be configured to simultaneously test multiple offers, messages, and content elements and to automatically render program pages to show the best content for each visitor, based on test results and user profile. The reporting function 1665 may permit marketers to view their viral marketing program reports in real-time from any web browser.

The analytical layer 1650 of the disclosed system and method may constantly monitor and manage a viral marketing program's performance, tracking viral metrics to drive optimum results. The disclosed system and method may perform multiple cycles of multivariate testing and refinement. The viral market opportunity is modeled and appropriate goals, objectives, and performance metrics are set. By applying advanced models to existing customer base, motivational and behavioral profiles are developed for target audiences. Program factors shown to have the greatest impact on viral success are tested, using research and analysis to predict the most effective motivators, messages, and other factors. During each cycle, several variations of different elements or attributes are tested in various combinations, and new visitors to the viral micro-site may be intelligently assigned to one of the combinations being evaluated. The visitors behavior is analyzed, and findings are leveraged into a series of new tests. With each test cycle the viral marketing program gets more effective. As a result detailed insight is provided that can be leveraged in other marketing channels.

Test factors or attributes include viral offer factors, motivational factors, and structural factors. Viral offer factors may include one or more of the product being showcased, price points and/or discounts offered, number of successful referrals required, individual and/or cumulative value of purchases, and/or length and/or complexity of the lead form. Motivational factors may include one or more of the incentive type and/or value, emphasis on benefit to the participant or to their social contacts, use of on-brand and/or off-brand motivators, motivational messaging and or other similar attributes. Among the structural factors considered in analyzing a viral marketing program are the page flow and/or order of steps in viral process, design of viral micro-site, inclusion of additional steps in the process and/or other similar design factors.

The content testing and optimization tools may include a dynamic content testing engine, multivariate and A/B testing, automated user segmentation and or automated user experience consistency. The dynamic testing engine quickly tests and optimizes marketing messages and content. Multivariate and A/B testing tests multiple versions of creative and persuasive factors at once to find the most effective combination. Users may be automatically segmented and targeted based on their behavior, without the need to pull lists manually. Microsite pages and e-mails may be dynamically displayed to show each user the appropriate content, ensuring a consistent, optimum automated user experience.

One embodiment of the viral analytics function 1655 may be implemented based on analysis of real-world scenarios and multiple viral metrics to hone in on proven viral performance indicators that drive real, measurable business results and facilitate achieving maximum virality. "Virality" represents the rate and pattern by which program participants attract additional participants through the use of social connections. Improvements in virality ultimately lead to increases in brand awareness, new leads, and new customers through the viral channel. The disclosed system and method may be designed to deliver results on a predictable, sustainable, and scalable basis. One embodiment of the disclosed viral analytics function 1655 continuously analyzes a comprehensive set of program attributes for their impacts on virality and overall viral performance. Through a combination of multivariate testing, user behavioral analysis, and predictive analytics, the platform enables real-time insights and optimization to help achieve maximum virality, honing in over time to provide the user experience that leads to the most desirable business goals.

One aspect of one embodiment of the disclosed analytics layer 1650 is that as more traffic flows through each viral marketing program, the viral analytics engine develops stronger aggregate hypotheses and statistical heuristics. This "knowledge base" of information enables continue optimization of viral marketing programs towards proven best practices, and ensures that new programs leverage the intelligence gained from previously observed results.

Embodiments of the disclosed system and method may utilize an advanced viral analytics layer 1650 including an optimization engine 1660 designed to optimize programs that translate directly into business results. The advanced viral analytics engine analyzes what program participants are doing, and then tailors each program to facilitate the viral results that makes the most sense for the brand. The disclosed system and method may analyze scenarios and user behavioral metrics to help drive each program's success.

The reporting tools 1665 may include one or more of a client dashboard 1666, executive summary 1667, administrative dashboard 1668 and viral profiles or behavioral analysis tools 1669. In one embodiment, the client dashboard 1666 is web-accessible and may be configured to track Viral Performance Indicators (VPIs) and overall program success from any web browser. The executive summary 1667 may be updated in real-time so as to provide straight-forward actionable results. Administrative dashboard 1668 may track various metrics used to monitor and improve performance of the viral program, and to identify and correct any technical issues. Viral profiles or behavioral analysis tools 1669 may include detailed analysis of best motivators and viral value for each individual.

The communications layer 1680 manages all viral e-mail associated with the program to ensure regulatory compliance with a compliance module 1685, delivery management with a delivery management module 1690 and behavioral targeting with a targeting module 1695. Scaling and e-mail management may include configuration of a selected communications suite, providing seeding strategy, developing and optimizing seeding media, copywriting, testing, and optimization of copy for viral e-mail and monitoring deliverability and management of all viral e-mail. The communications layer 1680 of the technical platform supports compliance with regulatory guidelines including CAN-SPAM utilizing the compliance module 1685. The deliverability management module 1690 may be accomplished by coordinating with ISPs to ensure delivery and in-boxing of viral marketing program e-mails. The targeting module 1695 which may utilize a behavioral communications suite generates automatically targeted communications based on consumers' behavioral patterns and viral profiles allowing e-mail to be event-triggered and personalized and eliminating the need for manual segmentation.

Thus, the communications layer 1680 which includes e-mail management tools may include E-mail deliverability monitoring and management, CAN-SPAM compliance, dynamic customization and personalization, content testing and optimization and/or event-based and behavioral communications suites. Reliable, cost-effective delivery of all viral e-mail may be monitored and managed to maximize delivery to recipients' inboxes. Embodiments of the disclosed system and method support regulatory compliance and best practices for permission-based marketers. The dynamic customization and personalization cause E-mails to appear to come from trusted friends, not a bulk mailer, and may even contain customized offers and messages. Subject lines and message content are tested and optimized to maximize click-through and viral performance. The disclosed system and method may define and send customized, targeted messages whose content and timing are determined by the participant's behavior in the viral program.

When marketing to leads generated through the disclosed system and method, customers have some assurance that they are contacting engaged, enthusiastic consumers who opted in to their database. Viral marketing program-related mailings may be monitored for deliverability and manage local and global opt-out requests.

The disclosed system and method may include features that protect consumers and customers to allow program participants to feel safe through every step of the viral process, including, but not limited to, registering on program microsites, using the social networking tools and/or sending friend-to-friend e-mail messages. The disclosed method and system may be configured with personal information safeguards so that information provided by participants is used only within the contexts for which they have given permission.

The disclosed system and method may include dedicated Client Services Manager (CSM) that guides the marketer through every step of the viral process, from design and testing through optimization and scaling for long-term results. Additionally the disclosed system and method may utilize a team acting behind the scenes to regularly monitor customer's program's functional and performance metrics, ensuring that it is performing to expectations. Among services that may be provided in implementing the disclosed system and method are services related to viral strategy, publishing, content testing and optimization, scaling and e-mail management as well as other services. The viral strategy services may include one or more of the following alone or in combination: setting goals, objectives, and performance metrics; researching and developing motivational and behavioral profiles; modeling viral market opportunity by applying proprietary models to existing customer base; and, creating a program testing and optimization strategy, following viral best practices.

Content analysis and optimization involves analyzing key viral performance indicators (VPIs) or metrics for each combination of test factors. Based on this analysis, new content and program factors can be developed and tested as necessary, refining and improving the program based on findings. The content analysis monitors VPIs and routes traffic through the most effective combinations for maximum return on investment.

The disclosed system and method may include one or more of the following features: ongoing optimization of program elements using advanced multivariate testing and viral analytics; the ability to easily invite multiple users from within a social network simultaneously; multi-generational effects creating sustainable, exponential viral impact; and the ability to optimize programs for specific marketing goals such as increased brand impressions, new lead generation, and/or improved monetization rates.

Embodiments of the disclosed system and method may include programs that are fully hosted, managed solutions, available on a subscription basis and may not require the acquisition or installation of additional software to install or equipment by the customer Embodiments of the disclosed system and method may be 100% hosted, and delivered as a web service or may implemented in the customer's computer system. Alternatively, viral marketing programs can operate as a standalone "micro-site" with personalized branding, or can be integrated with a customer's primary site.

As will be recognized by those of ordinary skill in the art of viral marketing, effective seeding and high seeding volume leads to faster program optimization and realization'realization of business results, whereas ineffective or low-volume seeding prevents the program from realizing its potential. Viral programs benefit from a steady source of seed traffic. The disclosed system and method may indicate the best sources and right volume for a viral marketing program. The disclosed system and method envision that viral marketing programs can be seeded in many different ways—including post-purchase links, newsletter links, e-mail announcements, external media buys, and other seed sources.

Although the invention has been described in detail with reference to certain preferred or illustrative embodiments, variations and modifications exist within the scope and spirit of the invention.

What is claimed is:

1. A computer implemented method of improving the performance of a viral marketing program comprising:
    exposing, via a computer network, a first offered incentive to a first plurality of users;
    requiring a pre-defined first consumer viral marketing action to be completed to receive the first offered incentive;
    collecting, via the computer network, first data indicative of the first plurality of users' progress toward achieving the pre-defined first consumer viral marketing action, which collected first data provides a likelihood of the first offered incentive obtaining an objective;
    exposing, via the computer network, a second offered incentive to a second plurality of users;
    requiring a pre-defined second consumer viral marketing action to be completed to receive the second offered incentive;
    collecting, via the computer network, second data indicative of the second plurality of users' progress toward achieving the pre-defined second consumer viral marketing action, which collected second data provides a likelihood of the second offered incentive obtaining the objective; and
    comparing, utilizing a processor, the collected first data to the collected second data using a metric to identify which of the first and second offered incentives is more likely to obtain the objective.

2. The computer implemented method of claim 1, wherein the first offered incentive is identical to the second offered incentive, and wherein the first consumer viral marketing action is distinct from the second consumer viral marketing action.

3. The computer implemented method of claim 1, wherein the first offered incentive is distinct from the second offered incentive, and wherein the first consumer viral marketing action is identical to the second consumer viral marketing action.

4. The computer implemented method of claim 1, wherein the first offered incentive is distinct from the second offered incentive, and wherein the first consumer viral marketing action is distinct from the second consumer viral marketing action.

5. The computer implemented method of claim 1, wherein at least one of the first consumer viral marketing action and second consumer viral marketing action is selected from the group consisting of: (i) registering at a site associated with the viral marketing program, (ii) clicking a link in an email associated with a first or second offered incentive, (iii) sending a predetermined number of emails to friends, and (iv) getting a predetermined number of friends to register at a site associated with the viral marketing program.

6. The computer implemented method of claim 1, further comprising:
exposing, via the computer network, a respective user of the first plurality of users to a status page.

7. The computer implemented method of claim 6, wherein the status page indicates the respective user's progress toward achieving the pre-defined first consumer viral marketing action.

8. The computer implemented method of claim 6, wherein progress toward achieving the pre-defined first consumer viral marketing action comprises getting invitees of the respective user to take a requisite action and the status page indicates whether invitees of the respective user have taken the requisite action.

9. The computer implemented method of claim 1, further comprising:
additionally requiring an act of registration be completed to receive the first offered incentive.

10. The computer implemented method of claim 1, wherein the metric is an invitation metric.

11. The computer implemented method of claim 1, wherein the metric is an incentive metric.

12. The computer implemented method of claim 1, wherein the metric is a page views metric.

13. The computer implemented method of claim 1, wherein the metric is a page conversion rate metric or an offspring count metric.

14. The computer implemented method of claim 1, wherein the exposing the first offered incentive to the first plurality of users comprises sending a first invitation including the first offered incentive to the first plurality of users.

15. The computer implemented method of claim 14, wherein the first invitation contains a clickable link directing a web browser of a respective user of the first plurality of users, to a site associated with the viral marketing program, and wherein the collecting first data includes tracking the respective user's interaction with the site.

16. The computer implemented method of claim 1, wherein the objective is at least one of a) maximizing a number of participants in a program, b) maximizing a number, amount or both the number and amount of consumer viral marketing actions, or c) minimizing an outlay required for objectives a, b, or both a and b.

17. The computer implemented method of claim 1, further comprising:
continuing to utilize the identified offered incentive while ceasing use of the non-identified offered incentive.

18. A system, for improving the performance of a viral marketing program, comprising:
one or more processors; and
memory storing one or more programs to be executed by the one or more processors;
the one or more programs comprising instructions for:
exposing, via a computer network, a first offered incentive to a first plurality of users;
requiring a pre-defined first consumer viral marketing action to be completed to receive the first offered incentive;
collecting, via the computer network, first data indicative of the first plurality of users' progress towards achieving the pre-defined first consumer viral marketing action, which collected first data provides a likelihood of the first offered incentive obtaining an objective;
exposing, via the computer network, a second offered incentive to a second plurality of users;
requiring a pre-defined second consumer viral marketing action to be completed to receive the second offered incentive;
collecting, via the computer network, second data indicative of the second plurality of users' progress toward achieving the pre-defined second consumer viral marketing action, which collected second data provides a likelihood of the second offered incentive obtaining the objective; and
comparing, utilizing a processor, the collected data using a metric to identify which of the first and second offered incentives is more likely to obtain the objective.

19. A non-transitory computer readable storage medium storing one or more programs configured for execution by a computer, the one or more programs comprising instructions for:
exposing, via a computer network, a first offered incentive to a first plurality of users;
requiring a pre-defined first consumer viral marketing action to be completed to receive the first offered incentive;
collecting, via the computer network, first data indicative of the first plurality of users' progress toward achieving the pre-defined first consumer viral marketing action, which collected first data provides a likelihood of the first offered incentive obtaining an objective;
exposing, via the computer network, a second offered incentive to a second plurality of users;
requiring a pre-defined second consumer viral marketing action to be completed to receive the second offered incentive;
collecting, via the computer network, second data indicative of the second plurality of users' progress toward achieving the pre-defined first consumer viral marketing action, which collected second data provides a likelihood of the second offered incentive obtaining the objective; and
comparing, utilizing a processor, the collected data using a metric to identify which of the first and second offered incentives is more likely to obtain the objective.

* * * * *